(12) United States Patent
Sung et al.

(10) Patent No.: US 11,028,749 B2
(45) Date of Patent: Jun. 8, 2021

(54) HYDROGEN REDUCTANT FOR CATALYTIC POLLUTION ABATEMENT

(71) Applicant: BASF CORPORATION, Florham Park, NJ (US)

(72) Inventors: Shiang Sung, New York, NY (US); Saeed Alerasool, Princeton, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/592,215

(22) Filed: Oct. 3, 2019

(65) Prior Publication Data

US 2020/0032688 A1 Jan. 30, 2020

Related U.S. Application Data

(63) Continuation of application No. PCT/IB2018/052300, filed on Apr. 3, 2018.

(60) Provisional application No. 62/481,237, filed on Apr. 4, 2017.

(51) Int. Cl.
| | |
|---|---|
| *B01D 53/94* | (2006.01) |
| *C01B 3/00* | (2006.01) |
| *C01B 3/04* | (2006.01) |
| *C25B 1/04* | (2006.01) |
| *F01N 3/20* | (2006.01) |

(52) U.S. Cl.
CPC ........... *F01N 3/206* (2013.01); *B01D 53/944* (2013.01); *B01D 53/9422* (2013.01); *C01B 3/0031* (2013.01); *C01B 3/047* (2013.01); *C25B 1/04* (2013.01); *B01D 2255/909* (2013.01)

(58) Field of Classification Search
CPC ...... F01N 3/0814; F01N 3/0842; F01N 3/103; F01N 2240/34; F01N 2250/12; F01N 2570/10; F01N 2570/12; F01N 2570/14; F01N 2610/04; B01D 53/14; B01D 53/565; B01D 53/74; B01D 53/864; B01D 53/8643; B01D 53/8656; B01D 53/944; B01D 53/9422; B01D 2251/202; B01D 2257/404; B01D 2257/502; B01D 2257/702; B01D 2258/012
See application file for complete search history.

(56) References Cited

U.S. PATENT DOCUMENTS

| | | | |
|---|---|---|---|
| 3,030,181 A | 4/1962 | Milton | |
| 4,440,871 A | 4/1984 | Lok et al. | |
| 4,544,538 A | 10/1985 | Zones | |
| 5,272,871 A * | 12/1993 | Oshima | B01F 5/0451 60/274 |
| 5,407,761 A | 4/1995 | Ovshinsky et al. | |
| 6,162,415 A | 12/2000 | Liu et al. | |
| 6,171,556 B1 | 1/2001 | Burk et al. | |
| 6,193,929 B1 | 2/2001 | Ovshinsky et al. | |
| 6,709,644 B2 | 3/2004 | Zones et al. | |
| 7,229,597 B2 | 6/2007 | Patchett et al. | |
| 7,264,789 B1 | 9/2007 | Verduijn et al. | |
| 7,704,475 B2 | 4/2010 | Bull et al. | |
| 7,998,423 B2 | 8/2011 | Boorse et al. | |
| 8,404,203 B2 | 3/2013 | Bull et al. | |
| 8,475,722 B2 | 7/2013 | Nakanishi et al. | |
| 9,011,807 B2 | 4/2015 | Mohanan et al. | |
| 9,017,626 B2 | 4/2015 | Tang et al. | |
| 9,242,238 B2 | 1/2016 | Mohanan et al. | |
| 9,321,042 B2 | 4/2016 | Hoke et al. | |
| 9,352,307 B2 | 5/2016 | Stiebels et al. | |
| 9,517,456 B2 | 12/2016 | Patchett et al. | |
| 9,757,717 B2 | 9/2017 | Patchett et al. | |
| 2001/0049339 A1 | 12/2001 | Schafer-Sindlinger et al. | |
| 2002/0002905 A1 | 1/2002 | Umino et al. | |
| 2002/0166546 A1 | 11/2002 | Andrews et al. | |
| 2003/0226349 A1 | 12/2003 | Klenk et al. | |
| 2004/0241507 A1 | 12/2004 | Schubert et al. | |
| 2004/0261398 A1 | 12/2004 | Childs et al. | |
| 2005/0103001 A1* | 5/2005 | Kupe | F01N 13/02 60/286 |
| 2007/0246351 A1 | 10/2007 | Smola et al. | |
| 2007/0274892 A1 | 11/2007 | Duvinage et al. | |
| 2008/0003470 A1 | 1/2008 | Christenson et al. | |
| 2008/0041034 A1 | 2/2008 | Hosoi | |
| 2008/0196588 A1 | 8/2008 | Gretta et al. | |
| 2008/0257751 A1 | 10/2008 | Smola et al. | |

(Continued)

FOREIGN PATENT DOCUMENTS

| | | | |
|---|---|---|---|
| DE | 4103668 | 8/1992 | |
| DE | 102 11 122 A1 * | 9/2003 | ............. F01N 3/206 |

(Continued)

OTHER PUBLICATIONS

"Ammonia for fuel update," New Energy and Fuel, Blog published Oct. 18, 2011; available online at https://newenergyandfuel.com/ http:/newenergyandfuel/com/2011/10/18/ammonia-for-fuel/ (Year: 2011)*

Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135.

N. Itoh, A. Oshima, E. Suga, T. Sato;"Kinetic enhancement of ammonia decomposition as a chemical hydrogen carrier in palladium membrane reactor," Catalysis Today 236 (2014) 70-76.

(Continued)

*Primary Examiner* — Timothy C Vanoy
(74) *Attorney, Agent, or Firm* — Finnegan, Henderson., Farabow, Garrett & Dunner, LLP

(57) ABSTRACT

Systems for abatement of pollutants in an exhaust gas stream of an internal combustion engine including a hydrogen injection article configured to introduce hydrogen upstream of a catalytic article are effective for the abatement of carbon monoxide and/or hydrocarbons and/or nitrogen oxides. The introduction of hydrogen may be intermittent and/or during a cold-start period.

16 Claims, 25 Drawing Sheets

(56) References Cited

U.S. PATENT DOCUMENTS

| | | |
|---|---|---|
| 2008/0274873 A1 | 11/2008 | Schubert |
| 2009/0107116 A1 | 4/2009 | Barber et al. |
| 2009/0263296 A1 | 10/2009 | Taques |
| 2009/0285740 A1 | 11/2009 | Sobolevskiy et al. |
| 2010/0024403 A1 | 2/2010 | Johannessen et al. |
| 2010/0024542 A1 | 2/2010 | Yen et al. |
| 2010/0186375 A1 | 7/2010 | Kazi et al. |
| 2010/0251700 A1 | 10/2010 | Wan et al. |
| 2011/0008694 A1 | 1/2011 | Tange et al. |
| 2011/0236790 A1 | 9/2011 | Schubert |
| 2011/0243823 A1 | 10/2011 | Botte |
| 2013/0047584 A1 | 2/2013 | Park |
| 2014/0363358 A1 | 12/2014 | Udd et al. |
| 2016/0136626 A1 | 5/2016 | Phillips et al. |
| 2016/0230255 A1 | 8/2016 | Young et al. |
| 2016/0298514 A1 | 10/2016 | Raux |
| 2016/0310897 A1 | 10/2016 | Tsuji et al. |
| 2016/0340182 A1 | 11/2016 | Hosono et al. |
| 2016/0348556 A1 | 12/2016 | Suyama |
| 2017/0204762 A1 | 7/2017 | Kotrba et al. |
| 2019/0242282 A1 * | 8/2019 | Li .................. F01N 3/106 |

FOREIGN PATENT DOCUMENTS

| | | | | |
|---|---|---|---|---|
| DE | 10 2007021827 B4 * | 10/2010 | ......... | F02D 41/0025 |
| DE | 10 2017100682 A1 * | 7/2017 | .............. | C25B 1/04 |
| EP | 0640378 | 3/1995 | | |
| EP | 2230001 | 9/2010 | | |
| EP | 2 301 650 A1 | 3/2011 | | |
| EP | 2 502 375 A2 | 2/2013 | | |
| EP | 2 933 020 A1 | 10/2015 | | |
| FR | 2941499 | 7/2011 | | |
| GB | 868846 | 5/1961 | | |
| GB | 2 469 977 B * | 5/2012 | .............. | F01N 3/206 |
| JP | H06146873 | 5/1994 | | |
| JP | 2006136776 | 6/2006 | | |
| JP | 2010203335 | 6/2006 | | |
| JP | 2010203335 | 9/2010 | | |
| KR | 970070445 | 11/1997 | | |
| KR | 20050115420 | 12/2005 | | |
| KR | 20100098143 | 9/2010 | | |
| KR | 101076841 | 10/2011 | | |
| KR | 101553587 | 9/2015 | | |
| WO | WO2014073576 | 5/2014 | | |
| WO | WO 2015 071121 A1 * | 5/2015 | .............. | F01N 3/206 |
| WO | WO2015145181 | 10/2015 | | |
| WO | WO2016034401 | 3/2016 | | |
| WO | WO2016070090 | 5/2016 | | |
| WO | WO2016138418 | 9/2016 | | |
| WO | WO2017019958 | 2/2017 | | |
| WO | WO2018185661 | 10/2018 | | |

OTHER PUBLICATIONS

William I. F. David, Joshua W. Makepeace, Samantha K. Callear, Hazel M. A. Hunter, James D. Taylor, Thomas J. Wood, Martin O. Jones, J, "Hydrogen production from ammonia using sodium amide,". Am. Chem. Soc. 2014, 136 (38).

Irena Short, Ashok Sahgal, Walter Hayduk, "Solubility of ammonia and hydrogen sulfide in several polar solvents,", J. Chem. Eng. Data 1983, v28(1), 63-66.

"Why on-board hydrogen generators won't boost your mileage," Blog entry published Aug. 4, 2008; available at https://www.autoblog.com/2008/08/04/why-on-board-hydrogen-generators-wont-boost-your-mileage/.

Kim et al.,"Devlopment on New Catalyst Technology for Compact SCR Modularization for Ship", The Korean Society of Industrial and Engineering Chemistry 2016 Spring Meeting.

Supplementary European Search Report dated Sep. 8, 2020 for European Application No. EP 18 78 0607.

International Search Report dated Jul. 24, 2019 for PCT/IB2018/052300.

Communication Pursuant to Article 94(3) EPC for corresponding EP Application No. 18 780 607.0, dated Apr. 15, 2021.

* cited by examiner

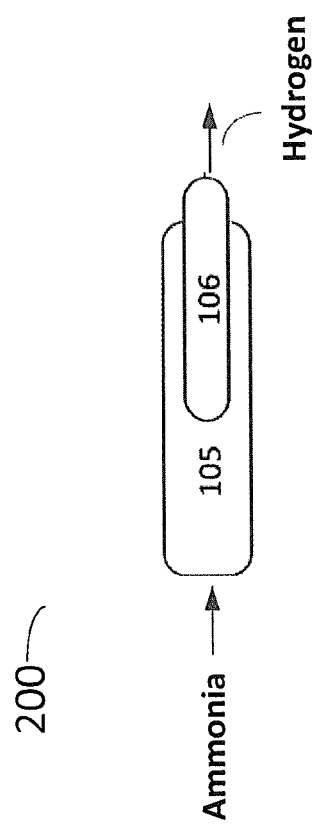

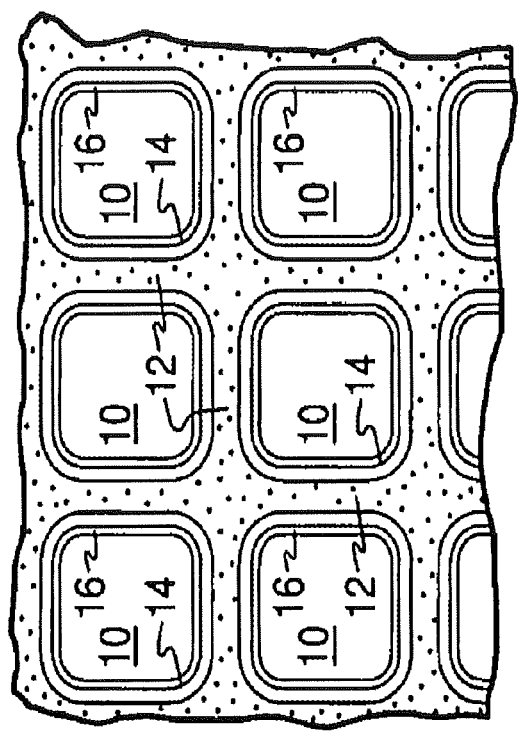
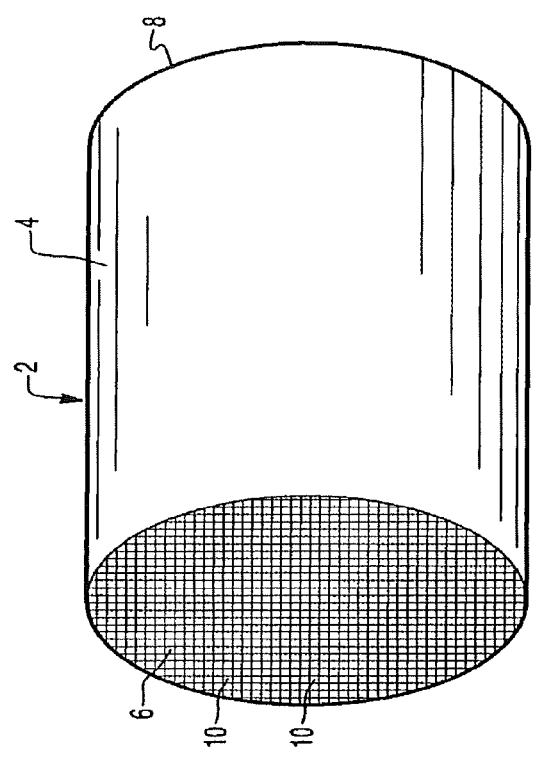

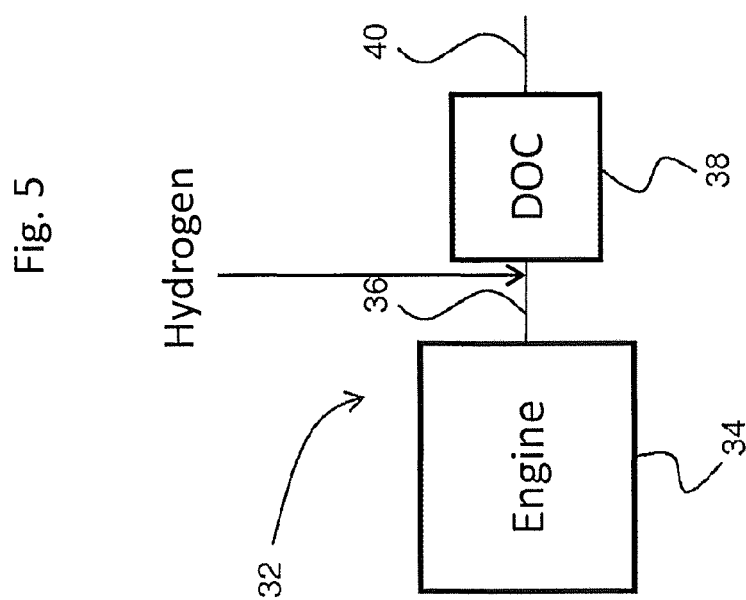

Fig. 21
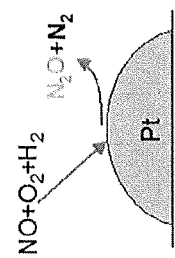
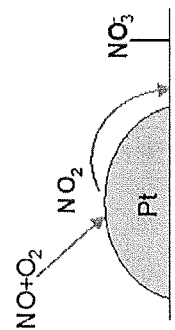

HYDROGEN REDUCTANT FOR CATALYTIC POLLUTION ABATEMENT

CROSS-REFERENCE TO RELATED APPLICATIONS

This application is a continuation of International Application No. PCT/IB2018/052300; filed Apr. 3, 2018, which International Application was published by the International Bureau in English on Oct. 11, 2018, and which claims priority to U.S. Provisional Application No. 62/481,237, filed on Apr. 4, 2017, the content of each of which is hereby incorporated by reference in its entirety.

FIELD OF THE INVENTION

The invention is aimed at systems, articles and methods for on-board vehicle hydrogen generation and use of hydrogen as a reductant in an exhaust gas stream of an internal combustion engine.

BACKGROUND OF THE INVENTION

Environmental regulations for emissions of internal combustion engines are becoming increasingly stringent throughout the world.

Operating a lean-burn engine, for example a diesel engine, provide the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOP) and the soot fraction. The SOF condenses on the soot in layers and is generally derived from unburned diesel fuel and lubricating oils. The SOF can exist in diesel exhaust either as a vapor or as an aerosol (i.e., line droplets of liquid condensate), depending on the temperature of the exhaust gas. Soot is predominately composed of particles of carbon.

Oxidation catalysts comprising a precious metal, such as platinum group metals (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOP portion), oxidation catalysts that contain PGM promote the oxidation of NO to $NO_2$. Catalysts are typically defined by their light-off temperature or the temperature at which 30% conversion is attained, also called $T_{50}$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the at to include a sorbent material, which may be a zeolite, as part of a catalytic treatment system in order to adsorb and/or absorb gaseous pollutants, usually hydrocarbons, and retain them during the initial cold-start period. As the exhaust gas temperature increases, the stored hydrocarbons are driven from the sorbent and subjected to catalytic treatment at the higher temperature.

$NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst article generally must provide a $NO_x$ trapping function and a three-way conversion function. Three-way conversion (TWC) generally refers to converting HC+CO to $CO_2+H_2O$ and reducing $NO_x$ to $N_2$.

Some lean $NO_x$ trap (LNT) catalyst articles contain alkaline earth elements. For example, $NO_x$ sorbent components include alkaline earth metal oxides, such as oxides of Mg, Ca, Sr or Ba. Other LNT catalyst articles can contain rare earth metal oxides such as oxides of Ce, La, Pr or Nd. The $NO_x$ sorbents can be used in combination with platinum group metal catalysts such as platinum dispersed on an alumina support for catalytic $NO_x$ oxidation and reduction. The LNT catalyst article operates under cyclic lean (trapping mode) and rich (regeneration mode) exhaust conditions during which the NO produced by the engine during combustion is converted to $N_3$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst. The SCR process uses catalytic reduction of nitrogen oxides with a reductant (e.g., ammonia) in the presence of atmospheric oxygen, resulting in the formation predominantly of nitrogen and steam:

$$4NO+4NH_3+O_2 \rightarrow 4N_2+6H_2O \text{(standard SCR reaction)}$$

$$2NO_2+4NH_3 \rightarrow 3N_2+6H_2O \text{(slow SCR reaction)}$$

$$NO+NO_2+NH_3 \rightarrow 2N_2+3H_2O \text{(fast SCR reaction)}$$

Current catalysts employed in the SCR process include molecular sieves, such as zeolites; ion-exchanged with a catalytic metal such as iron or copper.

A useful SCR catalyst component is able to effectively catalyze the reduction of the $NO_x$ exhaust component at temperatures below 600° C. so that reduced $NO_x$ levels can be achieved even under conditions of low load which typically are associated with lower exhaust temperatures.

Increasingly stringent emissions regulations have driven the need for developing emission gas treatment systems with improved CO, HC and NO oxidation capacity to manage CO, HC and NO emissions a low engine exhaust temperatures. In addition, development of emission gas treatment systems for the reduction of $NO_x$ (NO and $NO_2$) emissions to nitrogen has become increasingly important. Further, it is observed that precious metals tend to agglomerate and form charged particles under operating conditions, resulting in loss of catalytic activity.

While methods exist for the abatement of HC and $NO_x$ during cold-start conditions, improved methods are desired. Methods do not yet exist for the abatement of CO during cold-start conditions.

SUMMARY OF THE INVENTION

The present invention is aimed at on-board vehicle hydrogen generation, storage and use as a reductant in exhaust gas streams of internal combustion engines. Generated hydrogen may serve to aid oxidation of CO and/or HC and/or $NO_2$/$NO_x$ formation in an exhaust gas stream, especially during a cold-start period. Hydrogen reductant is, for example, suitable to regenerate precious metals, for instance precious metals present in a diesel oxidation catalyst (DOC). Further, hydrogen reductant may minimize nitrate formation which inhibits the precious metals from dissociating the molecular oxygen needed for low temperature oxidation.

The disclosure provides a system and related methods for abatement of pollutants in an exhaust gas stream of an internal combustion engine, the system comprising a hydrogen injection article configured to introduce hydrogen upstream of a catalytic article.

Accordingly, in one aspect is provided a system for abatement of pollutants in an exhaust gas stream of an internal combustion engine, the system comprising a catalytic article downstream of and in fluid communication with the internal combustion engine, a hydrogen injection article in fluid communication with the catalytic article and with the exhaust gas stream of the internal combustion engine and configured to introduce hydrogen into the exhaust gas stream upstream of the catalytic article and optionally, a hydrogen storage article.

In some embodiments the hydrogen injection article is configured to introduce hydrogen intermittently on-demand. In some embodiments, the hydrogen injection article is configured to introduce hydrogen from the hydrogen storage article. In some embodiments, the hydrogen injection article comprises a valve configured to prevent the exhaust gas stream from entering the hydrogen storage article.

In some embodiments, the hydrogen injection article is configured to introduce stored hydrogen during a cold-start period. In some embodiments, the hydrogen injection article is configured to introduce hydrogen when the exhaust gas stream entering the catalytic article is at a temperature of from about 0° C., to about 200° C. Advantageously, the injection or release of stored hydrogen is intermittent and/or during a cold-start period.

In some embodiments, the system is effective for the abatement of one or more pollutants in an exhaust gas stream, the pollutants selected from the group consisting of CO, HC, $NO_x$, and combinations thereof.

In some embodiments, the catalytic article is a diesel oxidation catalyst (DOC).

In some embodiments, the system is integrated with a vehicle electronic management system.

In some embodiments, the system is associated with a hydrogen generation system. In some embodiments, the hydrogen generation system comprises a water-splitting article or an ammonia decomposition article configured to generate hydrogen.

In another aspect is provided a vehicle comprising the system for abatement of pollutants in an exhaust gas stream as described herein.

In a further aspect is provided a method for abatement of pollutants in an exhaust gas stream of an internal combustion engine, the method comprising introducing stored hydrogen via a hydrogen injection article into the exhaust gas stream downstream from the internal combustion engine and upstream of a catalytic article.

In some embodiments, the method comprises intermittent introduction of the stored hydrogen, optionally, upon instruction from a vehicle electronic management system. In some embodiments, the method comprises introducing stored hydrogen during a cold-start period wherein the exhaust gas stream entering the catalytic article is at a temperature from about 60° C., to about 180° C.

In some embodiments, the method is effective in providing an increase in % conversion of one or more of CO, HC and $NO_x$ relative to the % conversion in the absence of injection or release of stored hydrogen, wherein the increase in % conversion is ≥5%, ≥10%, ≥15%, ≥20%, ≥25%, ≥30%, ≥35%, ≥40%, ≥45%, ≥50%, ≥55% or ≥60%.

In some embodiments, the catalytic article comprises a diesel oxidation catalyst (DOC), a $NO_x$-adsorber DOC (NA-DOC), or a lean $NO_x$-trap (LNT) catalyst composition.

In some embodiments, the method further comprises generating hydrogen on-board a vehicle in a water-splitting article or an ammonia decomposition article. In some embodiments, generating hydrogen comprises collecting and/or storing water, splitting the water into hydrogen and oxygen, collecting the hydrogen and storing the hydrogen. In some embodiments, generating hydrogen comprises isolating ammonia from an ammonia/organic solvent solution or releasing ammonia from an ammonia storage tank, decomposing the ammonia in a catalytic reactor to provide hydrogen, collecting the hydrogen, and storing the hydrogen. In some embodiments, one or more of the collecting, storing, splitting, isolating, releasing, and decomposing functions are performed via a vehicle on-board integrated system comprising articles configured for each function.

The present disclosure includes, without limitation, the following embodiments:

Embodiment 1

A system for abatement of pollutants in an exhaust gas stream of an internal combustion engine, the system comprising a catalytic article downstream of and in fluid communication with the internal combustion engine, and a hydrogen injection article in fluid communication with the catalytic article and with the exhaust gas stream of the internal combustion engine and configured to introduce hydrogen into the exhaust gas stream upstream of the catalytic article;

Embodiment 2

The system of the preceding embodiment, further comprising a hydrogen storage article.

Embodiment 3

The system of any preceding embodiment, wherein the hydrogen injection article is configured to introduce hydrogen intermittently on-demand.

Embodiment 4

The system of any preceding embodiment, wherein the hydrogen injection article is configured to introduce hydrogen from the hydrogen storage article.

Embodiment 5

The system of any preceding embodiment, wherein the hydrogen injection article comprises a valve configured to prevent the exhaust gas stream from entering the hydrogen storage article.

Embodiment 6

The system of any preceding embodiment, wherein the hydrogen injection article is configured to introduce stored hydrogen during a cold-start period.

Embodiment 7

The system of any preceding embodiment, wherein the hydrogen injection article is configured to introduce hydrogen when the exhaust gas stream entering the catalytic article is at a temperature of ≤200° C.

Embodiment 8

The system of any preceding embodiment, wherein the hydrogen injection article is configured to introduce hydrogen when the exhaust gas stream entering the catalytic article is at a temperature from about 0° C. to about 180° C.

Embodiment 9

The system of any preceding embodiment, wherein the hydrogen injection article is configured to introduce hydrogen when the exhaust gas stream entering the catalytic article is at a temperature of about 0°, about 1° C., about 20° C. about 30° C. about 40° C. about 50° C. about 60° C., about 70° C. or about 80° C., to about 90° C. about 100° C., about 110° C., about 120° C., about 130° C., about 140° C. about 150° C., about 160° C. about 170° C. about 180° C., or about 200° C.

Embodiment 10

The system of any preceding embodiment, wherein the system is effective for the abatement of one or more pollutants in an exhaust gas stream, the pollutants selected from the group consisting of CO, HC, $NO_x$ and combinations thereof.

Embodiment 11

The system of any preceding embodiment, wherein the catalytic article comprises a substrate having a catalytic coating disposed thereon.

Embodiment 12

The system of any preceding embodiment, wherein the catalytic article comprises an oxidation catalyst.

Embodiment 13

The system of any preceding, embodiment, wherein the catalytic article is a diesel oxidation catalyst (DOC), a lean $NO_x$-nap (LNT) catalyst, or a $NO_x$-adsorber DOC (NA-DOC) catalyst.

Embodiment 14

The system of any preceding embodiment, wherein the catalytic article comprises a substrate having a catalytic coating disposed thereon, the catalytic coating comprising a platinum group metal (PGM) component, wherein the catalytic article has a PGM loading in the range of about 5 $g/ft^3$ to about 250 $g/ft^3$, based on the volume of the substrate.

Embodiment 15

The system of any preceding embodiment wherein die catalytic article has a PGM loading of about 5 $g/ft^3$, 10 $g/ft^3$, about 15 $g/ft^3$, about 20 $g/ft^3$, about 40 $g/ft^3$, or about 50 $g/ft^3$, to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 $g/ft^3$, about 220 $g/ft^3$, about 230 $g/ft^3$, about 240 $g/ft^3$, or about 250 $g/ft^3$, based on the volume of the substrate.

Embodiment 16

The system of any preceding embodiment, wherein the catalytic article comprises a catalyst composition comprising a platinum group metal (PGM) component present in an amount from about 0.1 wt. % to about 20 wt. %, based on the weight of the dry composition.

Embodiment 17

The system of any preceding embodiment, wherein the catalytic article comprises a catalyst composition comprising a PGM component present in an amount about 0.1%, about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

Embodiment 18

The system of any preceding embodiment, wherein the catalytic article comprises a catalyst composition comprising a PGM component dispersed on a refractory metal oxide support.

Embodiment 19

The system of any preceding embodiment, wherein the catalytic article comprises a catalyst composition comprising a refractory metal oxide support selected from the group consisting of alumina, zirconia, silica, titania, ceria, manganese oxide, zirconia-alumina, cerin-zirconia, ceria-alumina, lanthana-alumina, baria-alumina, silica, silica-alumina, baria-zirconia, baria-titania, baria-zirconia-alumina, lanthana-zirconia, and combinations thereof.

Embodiment 20

The system of any preceding embodiment, wherein the catalytic article comprises a catalyst composition comprising a platinum group metal component dispersed on a refractory metal oxide support and further comprising one or more metals selected from the group consisting of lanthanum, barium, praseodymium, neodymium, samarium strontium, calcium, magnesium, niobium, hafnium, gadolinium, terbium, dysprosium, erbium, ytterbium, manganese, iron, chromium, tin, zinc, nickel, cobalt and copper.

Embodiment 21

The system of any preceding embodiment, wherein the catalytic article comprises a flow-through monolith substrate having a catalytic coating disposed thereon or a wall-flow filter substrate having a catalytic coating disposed thereon.

Embodiment 22

The system of any preceding embodiment, wherein the system is integrated with a vehicle electronic management system.

Embodiment 23

The system of any preceding embodiment, wherein the system is associated with a hydrogen generation system.

Embodiment 24

The system of any preceding embodiment, further comprising a water-splitting article or an ammonia decomposition article configured to generate hydrogen.

Embodiment 25

A vehicle comprising the system of any preceding embodiment.

Embodiment 26

A method for abatement of pollutants in an exhaust gas stream of an internal combustion engine, the method comprising introducing stored hydrogen into the exhaust stream downstream of the internal combustion engine and upstream of a catalytic article.

Embodiment 27

The method of any preceding embodiment, comprising intermittent introduction of stored hydrogen.

Embodiment 28

The method of any preceding embodiment, comprising introducing stored hydrogen during a cold-start period.

Embodiment 29

The method of any preceding embodiment, wherein the exhaust gas stream entering the catalytic article is at a temperature of ≤200° C.

Embodiment 30

The method of any preceding embodiment, wherein the exhaust gas stream entering the catalytic article is at a temperature of about 0° C., about 10° C., about 20° C., about 30° C., about 40° C., about 50° C., about 60° C., about 70° C. or about 80° C., to about 90° C., about 100° C., about 110° C., about 120° C., about 130° C., about 140° C., about 150° C., about 160° C., about 170° C., or about 180° C.

Embodiment 31

The method of any preceding embodiment, wherein the exhaust gas stream entering the catalytic article is at a temperature from about 60° C. to about 180° C.

Embodiment 32

The method of any preceding embodiment, wherein the method is effective for the abatement of one or more pollutants in an exhaust gas stream, the pollutants selected from the group consisting of CO, HC, $NO_x$, and combinations thereof.

Embodiment 33

The method of any preceding embodiment, wherein the method is effective in providing an increase in % conversion of one or more of CO, HC, and $NO_2/NO_x$ relative to the % conversion in the absence of injection or release of stored hydrogen, wherein the increase in % conversion is ≥5%, ≥10%, ≥15%, ≥20%, ≥25%, ≥30%, ≥35%, ≥40%, ≥45%, ≥50, ≥55% or ≥60%.

Embodiment 34

The method of any preceding embodiment, wherein the catalytic article comprises an oxidation catalyst composition or a lean $NO_x$-trap (LNT) catalyst composition.

Embodiment 35

The method of any preceding embodiment, wherein the catalytic article comprises a diesel oxidation catalyst (DOC) composition or a $NO_x$-adsorber DOC (NA-DOC).

Embodiment 36

The method of any preceding embodiment, wherein the catalytic article comprises a substrate having a catalytic coating disposed thereon, the catalytic coating comprising a PGM component, wherein the catalytic article has a PGM loading in the range of about 5 $g/ft^3$ to about 250 $g/ft^3$, based on the volume of the substrate.

Embodiment 37

The method of any preceding embodiment, wherein the catalytic article comprises a substrate having a catalytic coating disposed thereon, the catalytic coating comprising a PGM component, wherein the catalytic article has a PGM loading of about 5 $g/ft^3$, 10 $g/ft^3$, about 15 $g/ft^3$, about 20 $g/ft^3$, about 40 $g/ft^3$, or about 50 $g/ft^3$, to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 g/ft³, about 220 g/ft³, about 230 g/ft³, about 240 g/ft³, or about 250 g/ft³, based on the volume of the substrate.

Embodiment 38

The method of any preceding embodiment, wherein the catalytic article comprises a catalyst composition comprising a PGM component present in an amount from about 0.1 wt. % to about 20 wt. %, based on the weight of the dry composition.

Embodiment 39

The method of any preceding embodiment, wherein the catalytic article comprises a catalyst composition comprising a PGM component present in an amount of about 0.1 wt. %, about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

Embodiment 40

The method of any preceding embodiment, wherein the catalytic article comprises a catalyst composition comprising a PGM component disposed on a refractory metal oxide support.

Embodiment 41

The method of any preceding embodiment, wherein the catalytic article comprises a catalyst composition comprising a PGM component disposed on a refractory metal oxide support. And wherein the refractory metal oxide support is selected from the group consisting of alumina, zirconia, silica, titania, ceria, manganese oxide, zirconia-alumina, ceria-zirconia, ceria-alumina, lanthana-alumina, baria-alumina, silica, silica-alumina, baria-zirconia, baria-titania, baria-zirconia-alumina, lanthana-zirconia and combinations thereof.

Embodiment 42

The method of any preceding embodiment, wherein the catalytic article comprises a catalyst composition comprising one or more metals selected from the group consisting of lanthanum, barium, praseodymium, neodymium, samarium, strontium calcium, magnesium, niobium, hafnium, gadolinium, terbium, dysprosium, erbium, ytterbium, manganese, iron, chromium, tin, zinc, nickel, cobalt and copper.

Embodiment 43

The method of any preceding embodiment, wherein the catalytic article comprises a flow-through monolith substrate having a catalytic coating disposed thereon or a wall-flow filter substrate having a catalytic coating disposed thereon.

Embodiment 44

The method of any preceding embodiment, comprising introducing stored hydrogen upon instruction from a vehicle electronic management system.

Embodiment 45

The method of any preceding embodiment, further comprising generating hydrogen on-board a vehicle.

Embodiment 46

The method of any preceding embodiment, further comprising generating hydrogen on-board a vehicle in a water-splitting article or an ammonia decomposition article.

Embodiment 47

The method of any preceding embodiment, comprising introducing stored hydrogen via a hydrogen injection article.

Embodiment 48

The method of any preceding embodiment, wherein the hydrogen injection article comprises a valve configured to prevent the exhaust gas stream from entering the hydrogen storage article.

Embodiment 49

The method of any preceding embodiment, wherein generating hydrogen comprises collecting and/or storing water, splitting the water into hydrogen and oxygen, collecting the hydrogen, and storing the hydrogen.

Embodiment 50

The method of any preceding embodiment, wherein the collecting, storing, and splitting functions are performed via a vehicle on-board integrated system comprising articles configured for each function.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure regardless of whether such features or elements are expressly combined in a specific embodiment description herein. This disclosure is intended to be read holistically such that any separable features or elements of the disclosed invention. In any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1B is a schematic depiction of an embodiment of a vehicle on-board system to generate hydrogen from ammonia according to the present disclosure;

FIG. 2A is a perspective view of a honeycomb-type substrate which may comprise a catalyst composition;

FIG. 2B is a partial cross-sectional view enlarged relative to FIG. 2A and taken along a plane parallel to the end faces of the carrier of FIG. 2A, which shows an enlarged view of a plurality of the gas flow passages shown in FIG. 2A;

FIG. 5 is a schematic depiction of an embodiment of an emission treatment system downstream of and in fluid communication with an internal combustion engine in which a hydrogen generation, storage and injection system of the invention is utilized;

FIG. 21 is a cartoon depiction of the mechanisms for NO conversion in the absence and presence of hydrogen.

DETAILED DESCRIPTION OF THE INVENTION

Figure 1A:
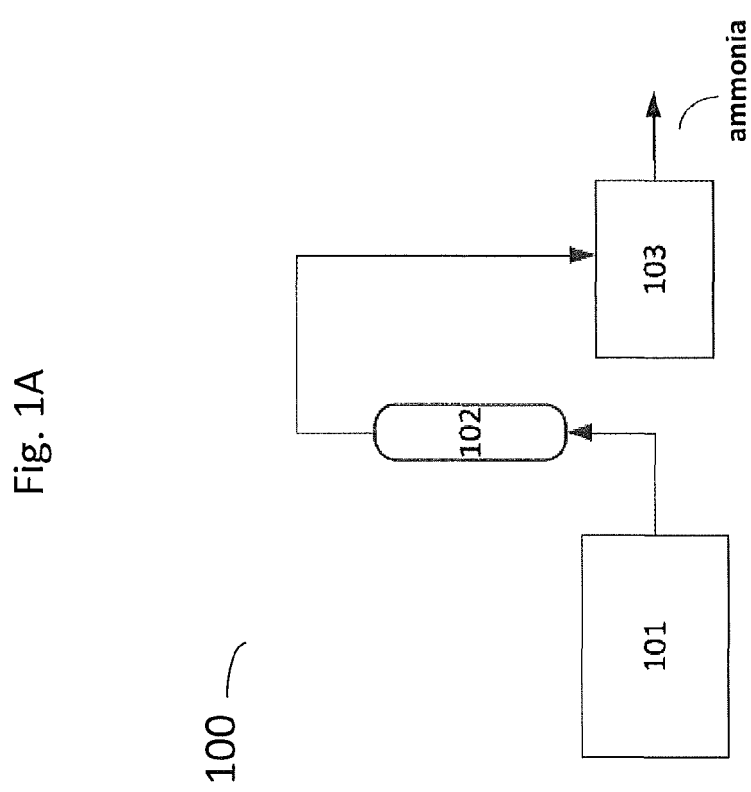
FIG. 1A is a schematic depiction of an embodiment of a vehicle on-board system to generate ammonia according to the present disclosure.

The present invention is aimed at on-board vehicle hydrogen generation, storage and use as a reductant in exhaust gas streams of internal combustion engines. Generated hydrogen may serve to aid oxidation of CO and/or HC and/or $NO_2$/$NO_x$ formation in an exhaust gas stream, especially during a cold-start period. Hydrogen reductant is, for example, suitable to regenerate precious metals, for instance precious metals present in a diesel oxidation catalyst (DOC). Further, hydrogen reductant may minimize nitrate formation which inhibits the precious metals from dissociating the molecular oxygen needed for low temperate oxidation.

Definitions

The articles "a" and "an" herein refer to one or to more than one (e.g., at least one) of the grammatical object. Any ranges cited herein are inclusive. The term "about" used throughout is used to describe and account for small fluctuations. For instance. "about" may mean the numeric value may be modified by ±5%, ±4%, ±3%, ±2%, ±1%, ±0.5%, ±0.4%, 0.3%, ±0.2%, ±0.1% or ±0.05%. All numeric values are modified by the term "about" whether or not explicitly indicated. Numeric values modified by the term "about" include the specific identified value. For example "about 5.0" includes 5.0. Where ranges are disclosed herein, each combination of lower endpoint and upper endpoint explicitly define a range that is contemplated as an embodiment of the invention.

The present invention is directed to systems, articles and methods for on-board vehicle hydrogen generation for use as a reductant in an exhaust gas stream of an internal combustion engine. The invention is also aimed at systems, articles and methods for on-board hydrogen generation from ammonia. Present systems comprise one or more "functional articles" or simply "articles", Functional articles comprise one or more certain functional elements, for instance reservoirs, tubing, pumps, valves, batteries, circuitry, meters, nozzles, reactors, filters, funnels and the like. The systems are integrated, that is, having interconnected articles and/or elements.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements. The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements The term "catalyst" refers to a material that promotes a chemical reaction. The catalyst includes the "catalytically active species" and the "carrier" that carries or supports the active species. For example, molecular sieves including zeolites are carriers/supports for copper active catalytic species. Likewise, refractory metal oxide particles may be a carrier for platinum group metal catalytic species.

The catalytically active species are also termed "promoters" as they promote chemical reactions. For instance, the present copper- or iron-containing molecular sieves may be termed copper- or iron-promoted molecular sieves. A "promoted molecular sieve" refers to a molecular sieve to which catalytically active species are intentionally added.

The term "catalytic article" in the invention means an article comprising a substrate having a catalyst coating composition.

The term "configured" as used in the description and claims is intended to be an open-ended term as are the terms "comprising" or "containing". The term "configured" is not meant to exclude other possible articles or elements. The term "configured" may be equivalent to "adapted".

In general, the term "effective" means for example from about 35% to 100% effective, for instance from about 40%, about 45%, about 50% or about 55% to about 60%, about 65%, about 70%, about 75%, about 80%, about 85%, about 90%, or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

The term "functional article" in the invention means an article comprising a substrate having a functional coating composition disposed thereon, in particular a catalyst and/or sorbent coating composition.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

As used herein, the term "promoted" refers to a component that is intentionally added to the molecular sieve material, typically through ion exchange, as opposed to impurities inherent in the molecular sieve. In order to promote the selective catalytic reduction of nitrogen oxides in the presence of ammonia, in one or more embodiments, a suitable metal is independently exchanged into the molecular sieve. According to one or more embodiments, the molecular sieve is promoted with copper (Cu) and/or iron (Fe), although other catalytic metals could be used without departing from the invention, such as manganese, cobalt, nickel, cerium, platinum palladium, rhodium or combinations thereof. Typical amounts of promoter metal include about 0.5 to about 15% by weight of the SCR catalyst material.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

The term "sorbent" refers to a material that adsorbs and/or absorbs a desired substance, in this invention, a $NO_x$ and/or CO and/or HC and/or $NH_3$. Sorbents may advantageously adsorb and/or absorb (store) a substance at a certain temperature and desorb (release) the substance at a higher temperature.

As used herein, the term "substrate" refers to the monolithic material onto which the catalyst composition, that is, catalytic coating, is disposed, typically in the form of a washcoat. In one or mare embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer.

As used herein, the term "washcoat" has its usual meaning in the an of a thin, adherent, coating of a catalytic or other material applied to a substrate material, such as a honeycomb-type carrier member, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt. % based on the weight of the washcoat.

The term "vehicle" means for instance any vehicle having an internal combustion engine and includes for instance passenger automobiles, sport utility vehicles, minivans, vans, trucks, buses, refuse vehicles, freight truck, construction vehicles, heavy equipment, military vehicles, farm vehicles and the like.

Unless otherwise indicated all parts and percentages are by weight. "Weight percent (wt. %)," if no otherwise indicated, is based on an entire composition free of any volatiles, that is, based on dry solids content.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Hydrogen Generation System

The present systems and methods may include on-board vehicle hydrogen generation and thus the systems may be integrated with a hydrogen generation system. Hydrogen may be generated on-board from water or ammonia. Alternatively, hydrogen may be stored outside a vehicle in a gaseous, liquid or solid state and brought and placed on-board and replenished as needed. Generated hydrogen may advantageously be injected into an exhaust gas stream of an internal combustion engine, where it will suitably function as a reductant in certain catalytic processes and/or catalyst regeneration processes. Catalytic processes include oxidation of CO and/or HC and/or formation of $NO_2/NO_x$ for downstream reduction by an SCR catalyst to abate pollutants.

Hydrogen may be stored in a hydrogen storage article, for example stored in a gas storage tank or reservoir. Hydrogen may be stored in a gaseous, liquid or solid state. Hydrogen may be stored for instance in a solid state, for example in silicon or a hydrogen storage alloy. Solid state hydrogen storage is taught for example in U.S. Pub. Nos. 2004/0241307, 2008/0003470, 2008/0274873, 2010/0024542 and 2011/0236790, each of which is incorporated by reference herein in their entirety. Hydrogen storage alloys reversibly store hydrogen and are disclosed for example in U.S. Pat. Nos. 5,407,761 and 6,193,929 and U.S. Pre-Grant Pub. No. 2016/0230255, each of which is incorporated by reference herein in their entirety. Hydrogen storage alloys are for example modified $AB_x$ type metal hydride (MH) alloys where in general. A is a hydride forming element and B is a weak or non-hydride forming element. A is in general a larger metallic atom with 4 or less valence electrons and B is in general a smaller metallic atom with 5 or more valence electrons. Suitable $AB_x$ alloys include those where x is from about 0.5 to about 5. The present alloys are capable of reversibly absorbing (charging) and desorbing (discharging) hydrogen, $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), AB, ($NdCo_3$, $GdFe_3$), $A_2B_7$ ($Pr_2Ni_7$, $Ce_2Co_2$) and $AB_5$ ($LaNi_5$, $CeNi_5$).

A hydrogen generation system may comprise a water-splitting functional article (water-splitting article). The water-splitting article may comprise an electrolytic cell configured to split water into hydrogen and oxygen via an electrochemical reaction. For instance, the water-splitting article may comprise a photoelectrode configured to initiate the electrochemical reaction. A photoelectrode is associated with a light source. Advantageously, the light source is a light emitting diode (LED), for example a blue light emitting diode. The light source will advantageously be associated with a battery. The battery is for example the main rechargeable vehicle battery.

Devices for hydrogen generation are disclosed for example in U.S. Pre-Grant Pub Nos. 2007/0246351 and 2008/0257751, each of which is incorporated by reference herein in their entirety.

The water source may advantageously be atmospheric water. For instance, the water source may be atmospheric water condensed by an air-conditioner condenser. Such water is otherwise lost to the roadway or parking lot. The present system may therefore comprise an article configured to collect and/or store water (a water collection article). The water collection article may be associated with an air-conditioner. The water collection article may be associated with a filter. The water source may also be for example bottled water.

The water may be supplied to the water-splitting article in the form of steam. The water may be heated to steam via captured heat generated by the internal combustion engine. Thus the system may comprise a heating article configured to convert water to steam. The heating article may be associated with an internal combustion engine or exhaust gas stream.

Generated hydrogen may be collected via a hydrogen collection article. For example, a hydrogen collection article may comprise a hydrogen separation membrane. Hydrogen separation membranes may comprise palladium or palladium alloys and may for instance be ≤1.0 mm thick. Hydrogen separation membranes may also comprise for example polymer, silica, ceramic or porous carbon. For example, the membrane is ≤0.1 mm thick, for example the membrane is from about 0.001 mm, from about 0.01 or from about 0.1 mm thick to about 0.2, about 0.5 or about 1 mm thick. The membrane may be supported with a perforated stainless steel sheet, for instance about 1 mm thick. Alternatively, the membrane may be supported on a porous ceramic tube or rod. The membrane may be associated with a heating element, e.g. an electrical heating element, to maximize the flow of hydrogen and separation from oxygen.

A hydrogen generation system may include a catalytic article ("catalytic reactor") configured to decompose ammonia into nitrogen and hydrogen (ammonia decomposition article).

The source of ammonia may be from an on-board ammonia reservoir or may be from ammonia brought on-board, for example in a tank adapted to contain gaseous or liquid ammonia (and adapted to release ammonia as needed). For instance, the system may comprise a tank adapted to contain ammonia and release ammonia (ammonia storage tank) and a catalytic reactor configured to decompose ammonia into hydrogen and nitrogen.

For example, the system may comprise an ammonia generation system and a catalytic reactor configured to decompose ammonia to hydrogen and nitrogen. An ammonia generation system may comprise a reservoir containing an ammonia/organic solvent solution which can be mounted (for example, on a vehicle) in proximity to other emission control system components. The ammonia/organic solvent solution will, in some embodiments, readily liberate gaseous ammonia. Advantageously, the organic solvent in the ammonia/organic solvent solution comprises an alkanol and/or a glycol, for example a solvent selected from the group consisting of ethanol, n-propanol, n-butano, n-pentanol, n-hexanol, n-heptanol, n-octanol, ethylene glycol, propylene glycol, isomers thereof and mixtures thereof. In certain embodiments, the organic solvent comprises n-butanol and/or ethylene glycol.

The ammonia/organic solvent solution may, for example, comprise from about 1%, about 2%, about 3%, about 4%, about 5%, about 6%, about 7%, about 8%, about 9%, about 10%, about 11%, about 12% or about 13%, to about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65%, or about 70% ammonia by weight, based on the weight of the ammonia/organic solvent solution. These concentrations are at ambient conditions of 25° C. and 1 am of pressure.

In some embodiments, the ammonia generation system comprises a reservoir containing an ammonia/organic solvent solution and a phase separator configured to isolate ammonia from the solution. The phase separator may operate in a similar fashion to a distillation column and is configured to isolate lower-boiling ammonia gas from higher-boiling organic solvent. The phase separator may be in thermal communication with a heat exchanger. In the context of this disclosure, two objects "in thermal communication" means that beat from one of the two objects may be used to drive a catalytic reaction in or cause gas to desorb from the other object. Thus, heat may be applied to the phase separator, feat applied may be, for example, from about 50° C. or about 60° C. to about 70° C. and the source of heat may be, for instance, waste heat generated from the engine during operation or the heat may be applied electrically.

The system may further comprise an ammonia storage container configured to store isolated ammonia, which may simply be for instance a suitable tank to hold ammonia gas. The container may be associated with a catalytic reactor configured to catalytically decompose ammonia into hydrogen and nitrogen.

The ammonia generation system may advantageously comprise a reservoir containing an ammonia/organic solvent solution, a phase separator configured to isolate ammonia from the solution, an ammonia storage container, and an ammonia injection article. The system is integrated with the articles and elements associated with each other.

An exemplary ammonia generation system 100 is shown in FIG. 1A. Reservoir 101 is configured to contain an ammonia/organic solvent solution. Ammonia may be directed to a phase separator 102 configured to isolate ammonia from the ammonia/organic solvent solution. Isolated ammonia may be directed to an ammonia storage container 103. One or more articles may be associated with a heat exchanger, for example reservoir 101 and/or phase separator 102, which heat exchanger(s) may be associated with waste heat from an engine.

The hydrogen generation system may, in some embodiments, comprise the articles and elements of the ammonia generation system described above. The catalytic reactor may be termed an "ammonia decomposition article."

The hydrogen generation system may comprise a phase separator and/or an ammonia storage container integrated with the reservoir and with the catalytic reactor.

The catalytic reactor may comprise an ammonia decomposition catalyst disposed on an inner surface thereof and/or onto high surface area supports which may be present within the volume of the reactor. The catalytic reactor may comprise a heat exchanger configured to provide waste heat generated from the internal combustion engine to the catalyst (to heat the catalyst). The ammonia decomposition catalyst may also be heated through the combustion of a fixed amount of ammonia and air.

For instance, the catalytic reactor may contain a coating composition comprising an ammonia decomposition catalyst disposed on an inner surface thereof and/or on a high surface area support present within the volume thereof. The catalytic reactor may advantageously be associated with a heat exchanger where for example the heat exchanger is associated with an internal combustion engine and adapted to provide waste heat from the engine to the reactor to heat the decomposition catalyst. Alternatively, the decomposition catalyst may be heated if desired through combustion of a fixed amount of ammonia and air.

Figure 18:
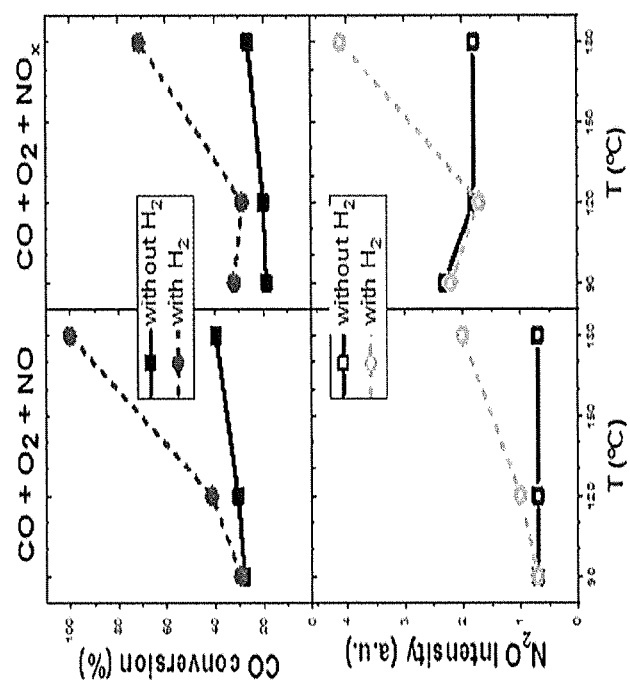
FIG. 18 is a graphical depiction of CO and N2O conversion under various conditions.

An exemplary on-board hydrogen generation system is configured to generate hydrogen via catalytic decomposition of ammonia and comprises a catalytic reactor configured to decompose ammonia to hydrogen and nitrogen, as shown in FIG. 18. In system 200, ammonia may be directed to a catalytic reactor 105. In one embodiment, ammonia may be directed to a catalytic reactor 105, configured to decompose ammonia into hydrogen and nitrogen. Catalytic reactor 105 may contain an ammonia decomposition catalyst disposed on an inner surface thereof and/or on high surface area supports present within the reactor volume. The catalytic reactor 105 may comprise a hydrogen separation membrane 106, which membrane may comprise a catalytic coating composition comprising an ammonia decomposition catalyst disposed on an outer surface of the membrane. The membrane is configured so that ammonia contacts the outer surface containing the decomposition catalyst. Ammonia decomposition catalysts include for example precious metals on silica, for example supported ruthenium. One or more articles may be associated with a heat exchanger, for example, catalytic reactor 105, which heat exchanger(s) may be associated with waste heat from an engine. Not shown are any necessary check valves, a hydrogen injector, not a nitrogen vent valve.

Ammonia decomposition catalysts include, for example, precious metals on silica, for example, supported ruthenium. Hydrogen separation membranes may comprise palladium or palladium alloys and may for instance be ≤1.0 mm thick. Hydrogen separation membranes may also comprise for example polymer, silica, ceramic or porous carbon. For example, the membrane is ≤0.1 mm thick, for example the membrane is from about 0.001 mm, from about 0.01 or from about 0.1 mm thick to about 0.2, about 0.5 or about 1 mm thick. The membrane may be supported with a perforated stainless steel sheet, for instance about 1 mm thick. Alternatively, the membrane may be supported on a porous ceramic tube or rod. The membrane may be associated with a heating element, e.g. an electrical heating element to maximize the flow of hydrogen and separation from oxygen.

The catalytic reactor may comprise a hydrogen separation membrane as above. The reactor may comprise a catalytic coating composition comprising an ammonia decomposition catalyst disposed on an inner space of the reactor and outside the membrane. The membrane is configured so that ammonia contacts the surface of the decomposition catalyst.

Hydrogen generated via water-splitting or catalytic ammonia decomposition may be stored in a hydrogen storage article on-board as described above.

The hydrogen generation article will advantageously contain a hydrogen injection article configured to introduce hydrogen into an exhaust gas stream of an internal combustion engine where it will suitably function as a reductant in certain catalytic processes and/or catalyst regeneration processes. The hydrogen injection article may be in fluid communication with an oxidation catalyst and configured to introduce hydrogen upstream of the oxidation catalyst, for example a diesel oxidation catalyst (DOC). The hydrogen injection article will typically be downstream of and in fluid communication with an internal combustion engine.

Figure 1C:
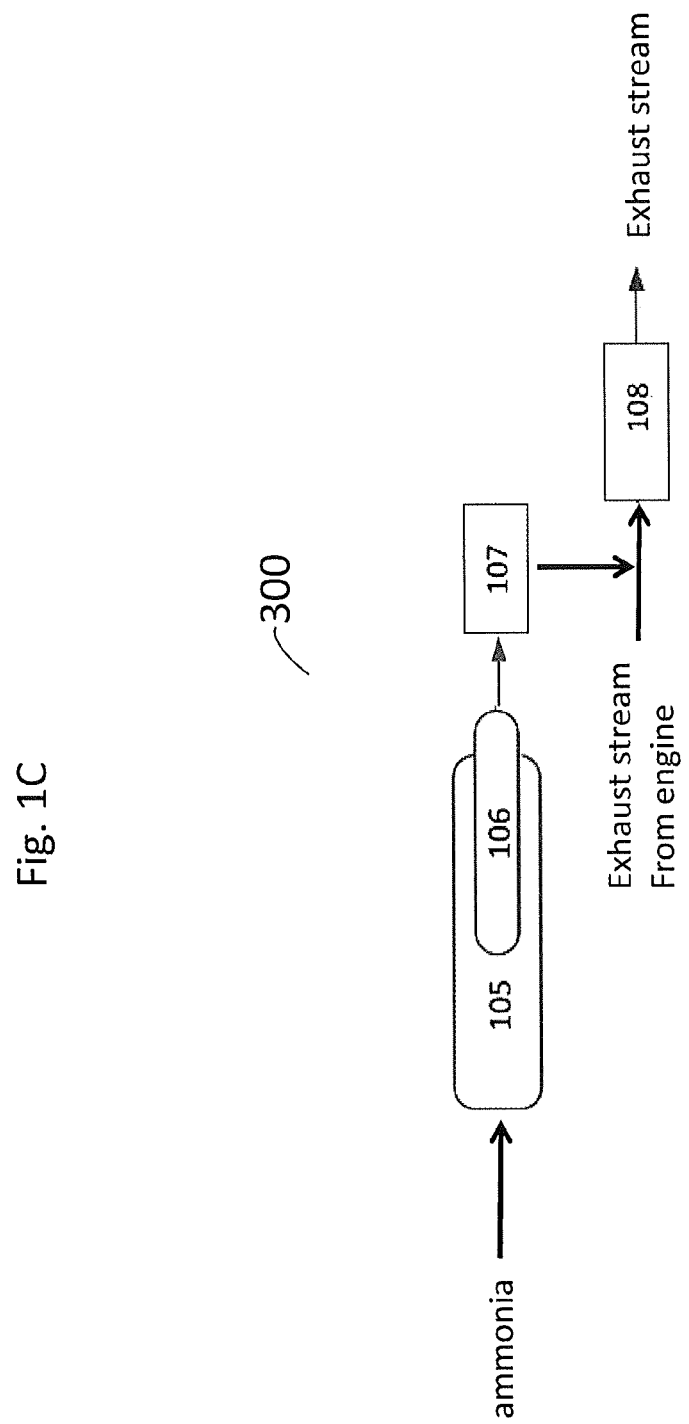
FIG. 1C is a schematic depiction of an embodiment of a vehicle on-board system to generate hydrogen from ammonia, and to store and/or utilize the hydrogen according to the present disclosure.

An exemplary system 300 according to the present disclosure for generating hydrogen from ammonia for use in an emission control system is shown schematically in FIG. 1C. In one embodiment, system 300 incorporates hydrogen generation system 200, as shown in FIG. 1B and described herein above. In one embodiment, ammonia may be directed to a catalytic reactor 105, configured to decompose ammonia into hydrogen and nitrogen. Catalytic reactor 105 may contain an ammonia decomposition catalyst disposed on an inner surface thereof and/or on high surface area supports present within the reactor volume. The catalytic reactor 105 may comprise a hydrogen separation membrane 106, which membrane can separate hydrogen from an ammonia-hydrogen mixture. Ammonia decomposition catalysts include for example precious metals on silica, for example supported ruthenium.

The catalytic reactor may be vented to release generated nitrogen. The membrane may serve to isolate hydrogen, which may be directed to a hydrogen storage article 107, isolated hydrogen may be directed to a DOC article 108, for example, be introduced upstream of a DOC article. One or more articles may be associated with a heat exchanger, for example catalytic reactor 105, which heat exchanger(s) may be associated with waste heat from an engine. Not shown are any necessary check valves, hydrogen injector, an ammonia injector or a nitrogen vent valve.

In some embodiments, a system is provided that comprises system 100, in some embodiments, a system is provided that comprises system 200, in some embodiments, a system is provided that comprises both system 100 and system 200, and in some embodiments, a system is provided that comprises system 100, system 200 and system 300.

The present system may suitably contain one or more hydrogen injection articles, for instance a valve configured to prevent the exhaust gas stream from entering the hydrogen storage article, and, configured to introduce hydrogen into an exhaust gas stream. Hydrogen will advantageously be "pulsed" or released intermittently into the exhaust gas stream to perform a desired reducing function upon demand (on-demand).

The system may advantageously be integrated into the engine electronic management algorithm (electronic management system), for instance as is urea injection for SCR functions.

Oxidation Catalyst Compositions

The oxidation catalyst, such as a DOC article, is suitable for example to oxidize NO and/or CO and/or HC components of exhaust gas. Suitable oxidation catalysts advantageously comprise a platinum group metal (PGM) dispersed on a refractory metal oxide support.

Oxidation catalysts comprising a precious metal, such as platinum group metals (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in DOCs, which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited.

The support material on which the catalytically active PGM is deposited for example comprises a refractory metal oxide, which exhibits chemical and physical stability at high temperatures, such as the temperatures associated with gasoline or diesel engine exhaust. Exemplary metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta dicta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 to about 350 $m^2/g$, for example from about 90 to about 250 $m^2/g$.

In certain embodiments, metal oxide supports useful in the catalyst compositions disclosed herein are doped alumina materials, such as Si-doped alumina materials (including, but not limited to 1.10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Advantageously, a refractory metal oxide may be doped with one or more additional basic metal oxide materials such as lanthanum oxide, barium oxide, strontium oxide, calcium oxide, magnesium oxide or combinations thereof. The metal oxide dopant is typically present in an amount of about 1 to about 210% by weight, based an the weight of the catalyst composition. The dopant oxide materials may serve to improve the high temperature stability of the refractory metal oxide support or function as a sorbent for acidic gases such as $NO_2$, $SO_2$ or $SO_3$.

The dopant metal oxides can be introduced using an incipient wetness impregnation technique or by addition of colloidal mixed oxide particles. Preferred doped metal oxides include baria-alumina, baria-zirconia, baria-titania, baria-zirconia-alumina, lanthana-zirconia and the like.

Thus the refractory metal oxides or refractory mixed metal oxides in the catalyst compositions are typically selected from the group consisting of alumina, zirconia, silica, titania, ceria, for example bulk ceria, manganese oxide, zirconia-alumina, ceria-zirconia, ceria-alumina lanthana-lumina, baria-alumina, silica, silica-alumina and combinations thereof. Further doping with basic metal oxides provides additional useful refractory oxide supports including but not limited to baria-alumina, baria-zirconia, baria-titania, baria-zirconia-alumina, lanthana-zirconia and the like.

The oxidation catalyst composition may comprise any of the above-named refractory metal oxides and in any amount. For example refractory metal oxides in the catalyst composition may comprise at least about 15, at least about 20, at least, about 25, at least about 30 or at least about 35 wt. % (weight percent) alumina where the wt. % is based on the total dry weight of the catalyst composition. The catalyst composition may for example comprise from about 10 to about 99 wt. % alumina, from about 15 to about 95 wt. % alumina or from about 20 to about 85 wt. % alumina. The oxidation catalyst composition comprises for example firm about 15 wt. %, about 20 wt. %, about 25 wt. %, about 30 wt. %, or about 35 wt. %, to about 50 wt. %, about 55 wt. %, about 60 wt. %, about 65 wt. %, or about 70 wt. % alumina based on the weight of the catalytic composition. Advantageously, the oxidation catalyst composition may comprise ceria, alumina and zirconia or doped compositions thereof.

Catalyst compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water-vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

The oxidation catalyst composition coated onto a substrate may comprise a PGM component from about 0.1 wt. % (weight percent), about 0.5 wt. %, about 1.0 w %, about 1.5 wt. %, or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. %, or about 20 wt. %, based on the weight of the dry composition.

The PGM component of the oxidation catalyst composition is, for example, present from about 5 $g/ft^3$, 10 $g/ft^3$, about 15 $g/ft^3$, about 20 $g/ft^3$, about 40 $g/ft^3$, or about 50 $g/ft^3$, to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$ about 190 $g/ft^3$, about 200 $g/ft^3$, about 210 $g/ft^3$, about 220 $g/ft^3$, about 230 $g/ft^3$, about 240 $g/ft^3$, or about 250 $g/ft^3$, based on the volume of the substrate.

The oxidation catalyst composition in addition to the refractory metal oxide support and catalytically active metal may further comprise any one or combinations of the oxides of lanthanum, barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt or copper.

Substrates

In one or more embodiments, the oxidation catalyst compositions as disclosed herein are disposed on a substrate to form a catalytic article. Present substrates for catalytic articles are 3-dimensional, having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder.

Any suitable substrate for the catalytic articles disclosed herein may be employed, such as a monolithic substrate of the type having fine parallel gas flow passages extending there through from an inlet or an outlet face of the substrate such that passages are open to fluid flow there through ("flow-through monolith"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through substrates and wall-flow filters will be further discussed herein below.

In one or more embodiments, the substrate is a ceramic or metal having a honeycomb structure. Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. The metallic substrates may be employed in various shapes such as pellets, corrugated sheer or monolithic foam. Specific examples of metallic substrates include heat-resistant, base-metal alloys, especially those in which iron is a substantial or major component. Such alloys may contain one or more of nickel chromium and aluminum and the total of these metals may advantageously comprise at least about 15 wt. % (weight percent) of the alloy, for instance, about 10 to about 23 wt. % chromium, about 1 to about 8 wt. % of aluminum, and from 0 to about 20 wt. % of nickel.

Examples of metallic substrates include those having straight channels; those having protruding blades along the axial channels to disrupt as flow and to open communication of gas flow between channels; and those having blades and also holes to enhance gas transport between channels allowing for radial gas transport throughout the monolith.

Flow-Through Monolith Substrates

Flow-through monolith substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. The flow-through monolith is ceramic or metallic as described above.

Flow-through monolith substrates for example have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

In one or more embodiments, the substrate is selected from one or more of a flow-through honeycomb monolith or a particulate filter, to which the catalyst material(s) are applied to the substrate as a washcoat. FIGS. 2A and 28 illustrate an exemplary substrate 2 in the form of a flow-through substrate coated with a catalyst composition as described herein. Referring to FIG. 2A, the exemplary substrate 2 has a cylindrical shape and a cylindrical outer surface 4, an upstream end face 6 and a corresponding downstream end face 8, which is identical to and face 6. Substrate 2 has a plurality of fine, parallel gas flow passages 10 formed therein. As seen in FIG. 2B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 2B. Further coating configurations are disclosed herein below.

Monolithic Wall-Flow Filter Substrates

Wall-flow filter substrates useful for supporting the catalytic coatings have a plurality of fine, substantially parallel gas flew passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

The wall-flow filter may have a volume of for instance from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$, or about 1000 cm$^3$, to about 1500 cm$^3$, about 2000 cm$^3$, about 2500 cm$^3$, about 3000 cm$^3$, about 3500 cm$^3$, about 4000 cm$^3$, about 4500 cm$^3$, or about 5000 cm$^3$.

Wall-flow substrates typically have a wall thickness from about 50 microns to about 2000 microns, for example from about 50 microns to about 450 microns or from about 15 microns to about 400 microns.

The walls of the wall-flow filters are porous and generally have a wall porosity of at least about 30% or at least about 60% with an average pore size of at least about 5 microns prior to disposition of the functional coating. For instance, the wall-flow filter will have a porosity of ≥50%, ≥60%, ≥65% or ≥70%, For instance, the wall-flow filters will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Figure 3:
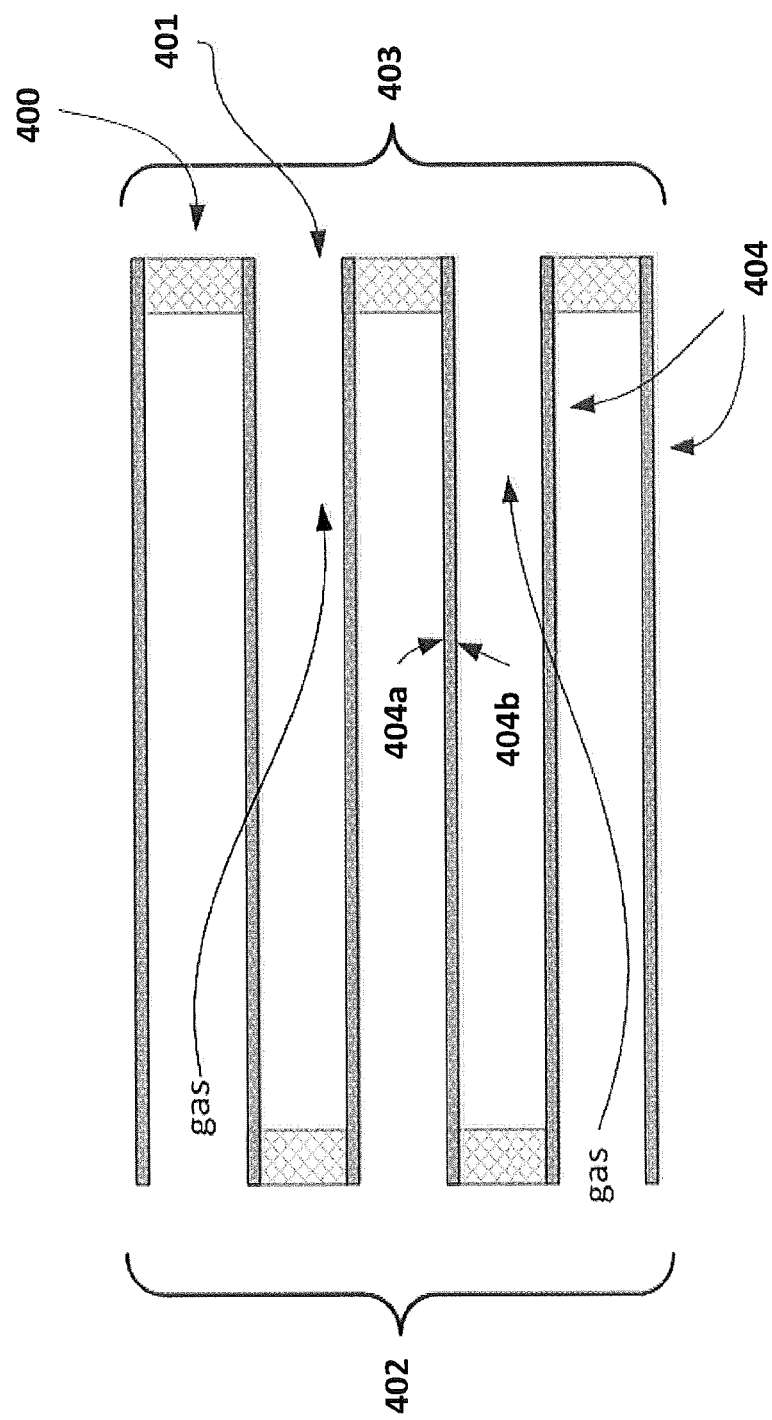
FIG. 3 is a cross-sectional view of a section of a wall-flow filter substrate.

A cross-section view of a wall-flow filter section is illustrated in FIG. 3, showing alternating plugged and open passages (cells). Blocked or plugged ends 400 alternate with open passages 401, with each opposing end open and blocked respectively. The filter has an inlet end 402 and outlet end 403. The arrows crossing porous cell walls 404 represent exhaust gas flow entering the open cell ends, diffusing through the porous cell walls 404, and exiting the open outlet cell ends. Plugged ends 400 prevent gas flow and encourage diffusion through the cell walls. Each cell wall will have an inlet side 404, and outlet side 404b. The passages are enclosed by the cell walls. The dark squares in FIG. 3 are plugged ends 400 and white squares are open ends 401.

Useful wall-flow filters typically have an aspect ratio (length/diameter or L/D) of from about 1 to about 20, for example from about 1.0, about 2.0, about 3.0, about 3.5, about 4.0, about 4.5, about 5.0 or about 5.5 to about 6.0, about 6.5, about 7.0, about 7.5, about 8.0, about 8.5, about 9.0, about 9.5, about 10.0, about 11.0, about 12.0, about 13.0, about 140, about 15.0, about 16.0, about 17.0 about 18.0, about 19.0 or about 20.0. By aspect ratio is meant the ratio of length to diameter of the filter. For instance, the wall-flow filters may have an aspect ratio of from about 3 to about 10. The high aspect ratio will allow the wall-flow filter to be fined in a close-coupled position close to the engine. This allows for fast heat-up of the catalyst composition; the exhaust gas will beat up the catalyst composition to the operating (catalytic) temperature faster than if it were in an under-floor position. A close-coupled position is, for instance, within about 12 inches (in) from the exhaust manifold (i.e., where individual cylinder exhaust pipes join together). In some embodiments, the distance from the exhaust manifold to the upstream end of the DOC unit is from about 0-5 in to about 12 inches. In some embodiments the distance is about 0.5 in, about 1 in, about 2 in, about 3 in. about 4 in, about 5 in, about 6 in, about 7 in, about 8 in, about 9 in, about 10 in about 11 in or about 12 in. Metallic substrates, in particular, are advantageously employed in certain embodiments in a close-coupled position, allowing for fast heat-up.

The porous wall flow filter can be catalyzed in that the wall of the substrate has thereon one or more catalytic materials Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and/or outlet walls of the substrate.

Catalyzed wall-flow filters are disclosed for instance in U.S. Pat. No. 7,229,597, which is incorporated herein by reference in its entirety. This reference teaches a method of applying a catalytic coating such that the coating permeates the porous walls, that is, is dispersed throughout the walls. Flow-through and wall-flow substrates are also taught, for example, in International Application Publication No. WO2016/070090, which is incorporated herein by reference in its entirety. Loading of the catalytic coating on a wall-flow substrate will depend on substrate properties such as porosity and wall thickness and typically will be lower than the catalyst loading on a flow-through substrate.

Oxidation Catalyst Composition Coatings

The catalytic coating that provides the oxidation catalyst composition of a DOC article may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 30%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The catalytic costing may comprise 1, 2 or 3 or more coating layers. The one or more coating layers together comprise the 3 catalytic compositions.

Zones of the present disclosure are defined by the relationship of coating layers. With respect to different coating layers, there are a number of possible zoning configurations. For example, there may be an upstream zone and a downstream zone; there may be an upstream zone, a middle zone and a downstream zone; there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

Different coating layers may be in direct contact with the substrate. Alternatively, one or more "undercoats" may be present, so that at least a portion a catalytic coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions. The present catalytic coatings may comprise more than one identical layer.

Figure 4A:
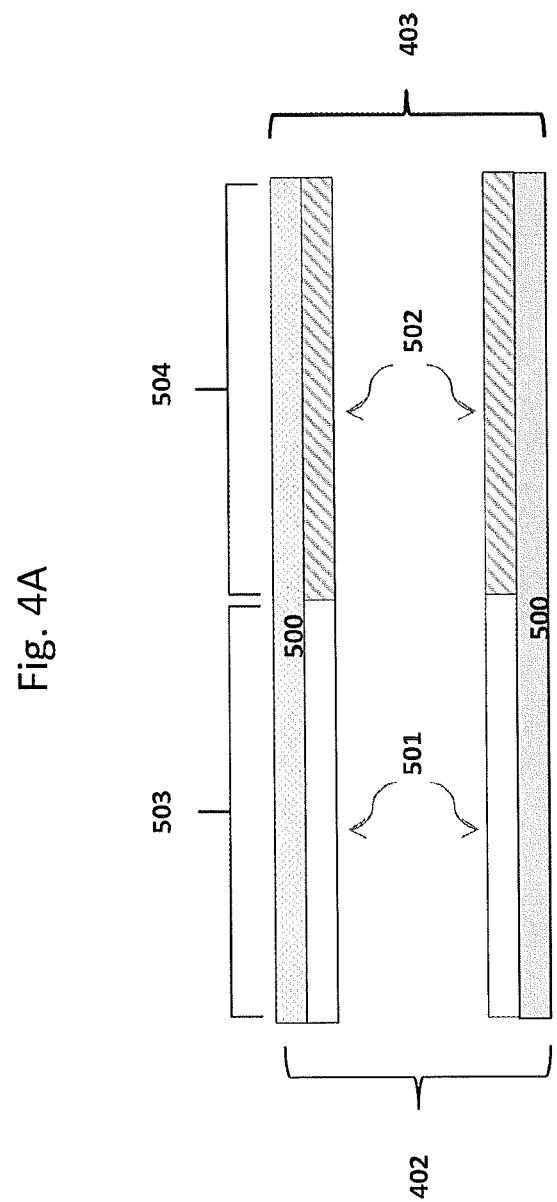
FIGS. 4A, 4B and 4C illustrate various coating configurations on the walls of a substrate.
Figure 4B:
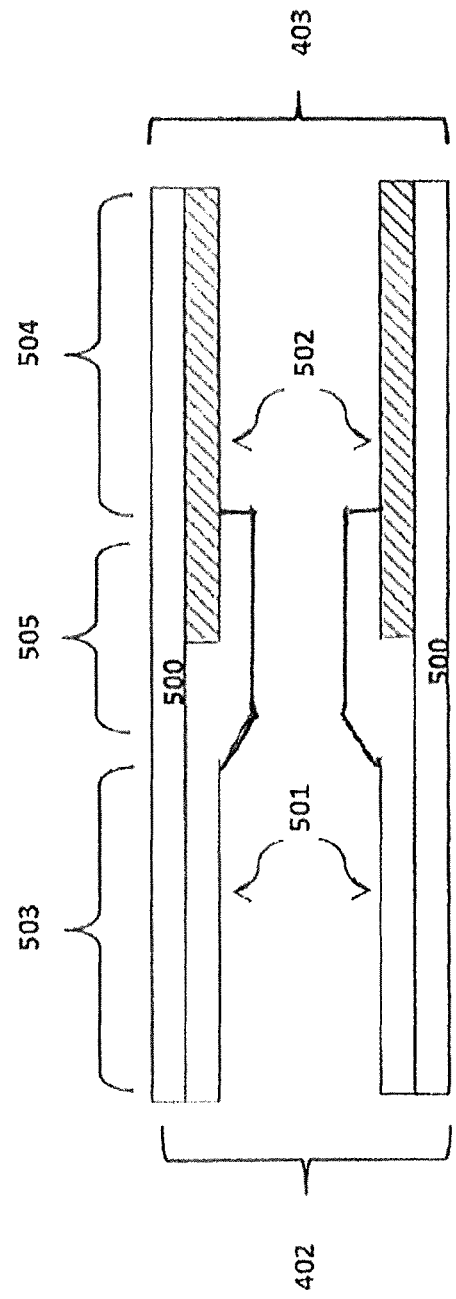
Figure 4C:
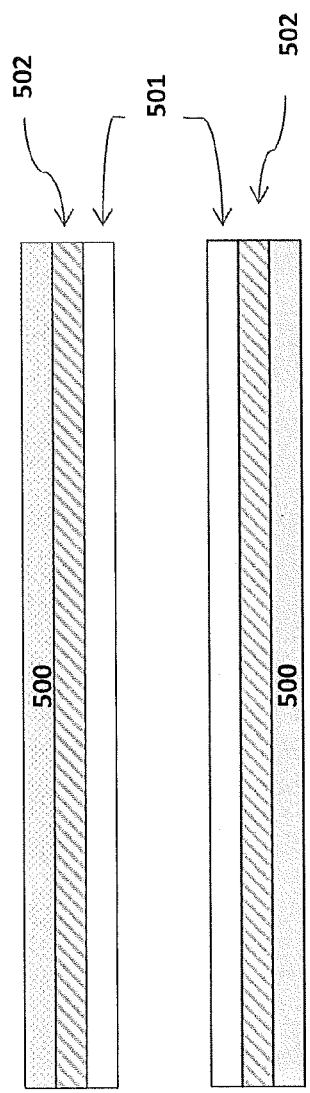

In some embodiments the substrate may have, for example, two coating layers e.g., one oxidation catalyst material as described herein and a second catalyst material (which can be an oxidation catalyst material or can be another type of catalyst material). FIGS. 4A, 4B and 4C show some possible coating layer configurations for a substrate with two such coating layers. Shown are substrate walls 500 onto which coating layers 501 and 502 are disposed. This is a simplified illustration, and in the case of a porous wall-flow substrate, not shown are pores and coatings in adherence to pore walls and not shown are plugged ends. In FIG. 4A, coating layer 501 (e.g., the oxidation catalyst material extends from the inlet 402 to the outlet 403 about 30% of the substrate length; and coating layer 502 (e.g., the second catalyst material) extends from the outlet to the inlet about 50% of the substrate length and the coating layers are adjacent each other, providing an inlet upstream zone 503 and an outlet downstream zone 504. In FIG. 48, coating layer 502 (e.g., the second catalyst material) extends from the outlet about 50% of the substrate length and layer 501 (e.g., the oxidation catalyst material) extends from the inlet greater than 50% of the length and overlays a portion of layer 502, providing an upstream zone 503, a middle zone 505 and a downstream zone 504. In FIG. 4C, coating layers 501 and 502 each extend the entire length of the substrate with layer 501 overlaying layer 502. The substrate of FIG. 4C does not contain a zoned coating configuration. FIGS. 4A, 4B and 4C may be useful to illustrate coating compositions on a wall-flow or flow-through substrate, e.g., of an oxidation catalytic article as described herein.

Exhaust Gas Treatment Systems

As mentioned, catalysts used to treat the exhaust of internal combustion engines are less effective during periods of relatively low, temperature operation, such as the initial cold-start period of engine operation, because the engine exhaust is not at a temperature sufficiently high for efficient catalytic conversion of noxious components in the exhaust. Accordingly, an aspect of the present invention is directed to exhaust gas treatment systems and methods.

In the present exhaust gas treatment systems and methods, the exhaust gas stream is received into the catalytic article or treatment system by entering the upstream end and exiting the downstream end. The inlet end of a substrate is synonymous with the "upstream" end or "front" end. The outlet end is synonymous with the "downstream" end or "rear" end. A substrate will have a length and a diameter. The treatment system is in general downstream of and in fluid communication with an internal combustion engine.

The present system may suitably contain one or more hydrogen injection articles configured to introduce hydrogen into an exhaust gas stream, for instance, the injection article comprises a valve configured to prevent the exhaust gas stream from entering the hydrogen storage article. The hydrogen generation article will advantageously contain a hydrogen injection article configured to introduce hydrogen into an exhaust gas stream of an internal combustion engine where it will suitably function as a reductant in certain catalytic processes and/or catalyst regeneration processes. The hydrogen injection article may be in fluid communication with an oxidation catalyst and configured to introduce hydrogen upstream of the oxidation catalyst, for example a diesel oxidation catalyst (DOC). The hydrogen injection article will typically be downstream of and in fluid communication with an internal combustion engine. Hydrogen will advantageously be "pulsed" or released intermittently into the exhaust gas stream to perform a desired reducing function upon demand (on-demand).

The system may advantageously be integrated into the engine electronic management algorithm (electronic management system), for instance as is urea injection for SCR functions One exemplary emissions treatment system is illustrated in FIG. 5, which depicts a schematic representation of an emission treatment system 32, downstream of and in fluid communication with an internal combustion engine 34. As, shown, an exhaust gas stream containing gaseous pollutants and particulate matter is conveyed via exhaust pipe 36 from an engine 34 to an optional diesel oxidation catalyst (DOC) 38. Other articles not shown may therefore include reservoirs, pumps, valves, mixing boxes, etc.

The exhaust gas treatment system may comprise a hydrogen injection article, configured to introduce hydrogen upstream of the oxidation catalyst unit 38. For example, the hydrogen injection article can be configured for intermittent injection or release of stored hydrogen. The system may be configured, for example, to introduce stored hydrogen during a cold-start period. In some embodiments, the hydrogen injection article comprises a check valve. Hydrogen may be brought on-board in a hydrogen storage article, or may be generated on-board from water-splitting or from ammonia decomposition. Ammonia decomposition to provide hydrogen may be performed as described herein, e.g., by catalytic decomposition. A suitable system to provide ammonia is depicted as system 100 in FIG. 1A and is described herein. Generation of hydrogen from ammonia decomposition is described herein and depicted in FIG. 1B as system 200. A suitable system for generating hydrogen from ammonia, storing the hydrogen, and providing it to a oxidation catalyst article is depicted in FIG. 1C as system 300, and is described herein.

The exhaust stream is next conveyed via exhaust pipe 40 to optional downstream components, such as, for example, a Catalyzed Soot Filter and/or a Selective Catalytic Reduction (SCR) article, not shown.

The oxidation catalyst composition of DOC 38 is suitable for example to oxidize NO and/or CO and/or HC components of exhaust gas. In the optional DOC 38, unburned gaseous and non-volatile hydrocarbons and carbon monoxide are largely combusted to form carbon dioxide and water. In addition, a proportion of the NO component may be oxidized to $NO_2$ in the DOC. Suitable oxidation catalyst compositions advantageously comprise a platinum group metal (PGM) dispersed on a refractory metal oxide support, as disclosed herein. The oxidation catalyst composition of DOC 38 may be coated on a flow, through monolith substrate or a wall-flow filter substrate as described herein.

The DOC unit is advantageously in a close-coupled position as described herein.

Exhaust Gas Treatment Methods

In one aspect is provided a method for abatement of pollutants in an exhaust gas stream of an internal combustion engine, the method comprising introducing stored hydrogen into the exhaust stream downstream of the internal combustion engine and upstream of a catalytic article.

In some embodiments, hydrogen is pulsed into the exhaust gas stream upstream of an oxidation catalyst composition, for example a diesel oxidation catalyst (DOC) as described herein above, during a cold-start period (i.e., the exhaust gas stream is at a temperature of ≤150° C.). Hydrogen serves to enhance low temperature oxidation NO and/or CO and/or NC pollutants. In some embodiments, the method is effective in providing an increase in % conversion of one or more of CO. HC and NO relative to the % conversion in the absence of injection or release of stored hydrogen. In some embodiments, the increase in % conversion is ≥5%, ≥10%, ≥15%, ≥20%, ≥25%, ≥30%, ≥35%, ≥40%, ≥45%, ≥50%, ≥55% or ≥60%. In some embodiments, the method further comprises generating hydrogen on-board a vehicle. In some embodiments, the method further comprises generating hydrogen on-board a vehicle upon instruction from a vehicle electronic management system. In some embodiments, the method comprises generating hydrogen on-board a vehicle in a water-splitting article or an ammonia decomposition article.

In some embodiments, generating hydrogen comprises collecting and/or storing water, splitting water into hydrogen and oxygen, collecting hydrogen and storing hydrogen. In some embodiments, the method comprises introducing stored hydrogen via a hydrogen injection article. In some embodiments, the hydrogen injection article comprises a valve configured to prevent the exhaust gas stream from entering the hydrogen storage article.

Present articles, systems and methods are suitable for treatment of exhaust gas streams from mobile emissions sources such as trucks and automobiles. Articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1. Two-Layer Catalytic Coating on Substrate (DOC Article)

A bottom coat catalyst slurry containing milled alumina powder impregnated with Pd (0.5 wt. %). Ba (0.8 wt. %) and Pt (0.3 wt. %) was prepared and adjusted to a pH of 4.5 to 5.0 with nitric acid. The bottom coat slurry had a solid content of 38 wt. %. A top coat slurry containing alumina/5 wt. % Mn and Pt-amine (3.3 wt. %) was prepared, milled and adjusted to a pH of 4.5 to 5.0 with nitric acid. The top coat slurry had a solid concentration 37 wt. %. Zeolite beta (0.35 g/in$^3$) was then added to the top coat slurry.

The bottom coat slurry was applied to the entire core length of a 1"×3", 400 cpsi (cell per square inch) honeycomb substrate via a washcoat technique. The coated substrate was air dried at 120° C. and calcined at 500° C. for 1 hour, providing a coating loading of 1.6 g/in$^3$. The top coat slurry was applied over the entire bottom coat and was dried and calcined as the bottom coat, to provide a total coating loading of 2.5 g/in$^3$ and a total PGM loading of 50 g/ft$^3$ with a Pt/Pd weight ratio of 3/1.

Example 2. Three-Layer Catalytic Coating on Substrate (DOC Article)

A bottom coat catalyst slurry containing milled alumina powder and a Ce/Al (50/50 wt. %) powder (weight ratio of about 1/6) was prepared to have a solid concentration of from 32 to 35 wt. %. Small amounts of zirconium accurate and alumina sol were added as binders. The slurry was coated on a 400 cpsi 1"×3" honeycomb to provide a bottom coat at 1.5 g/in$^3$.

A middle coat catalyst slurry is prepared by impregnating Pd nitrate on a Mn/Al support (5 wt. % Mn) followed by adding a Ba hydroxide solution. The impregnated powder is added to a Pt solution and the pH is adjusted to 4.5 to 5 with nitric acid. This slurry is coated onto the bottom-coated core to provide an additional coating loading of 1.8 g/in$^3$ and a Pt/Pd weight ratio of 18/14.

A top coat slurry was prepared by impregnating Pd nitrate on a Mn/A support (5 wt. % Mn) followed by Ba hydroxide solution. The impregnated powder was added to a Pt solution and the pH was adjusted to 4.5 to 5 with nitric acid. Zeolite beta was added to the slurry. The top coat slurry was applied to the coated onto the coated core, providing a three-layer coated core, with a further coating loading of 1.1 g/in$^3$ and Pt/Pd weight ratio of 17/3. Total PGM loading was 52 g/ft$^3$.

Example 3. Exhaust Gas Treatment

Figure 6:
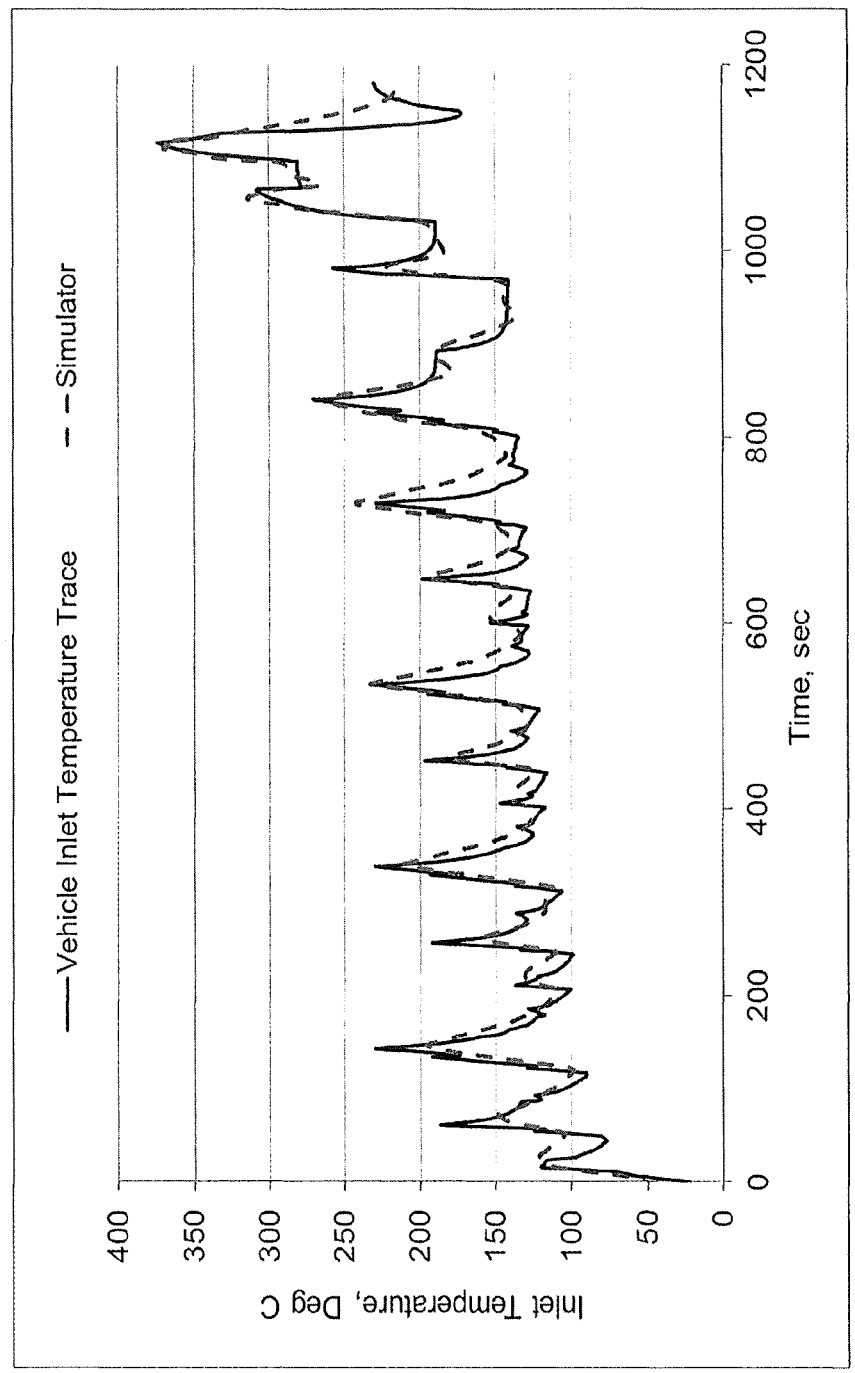
FIG. 6 is a graphical comparison of engine out temperature traces between vehicle and simulator.
Figure 7:
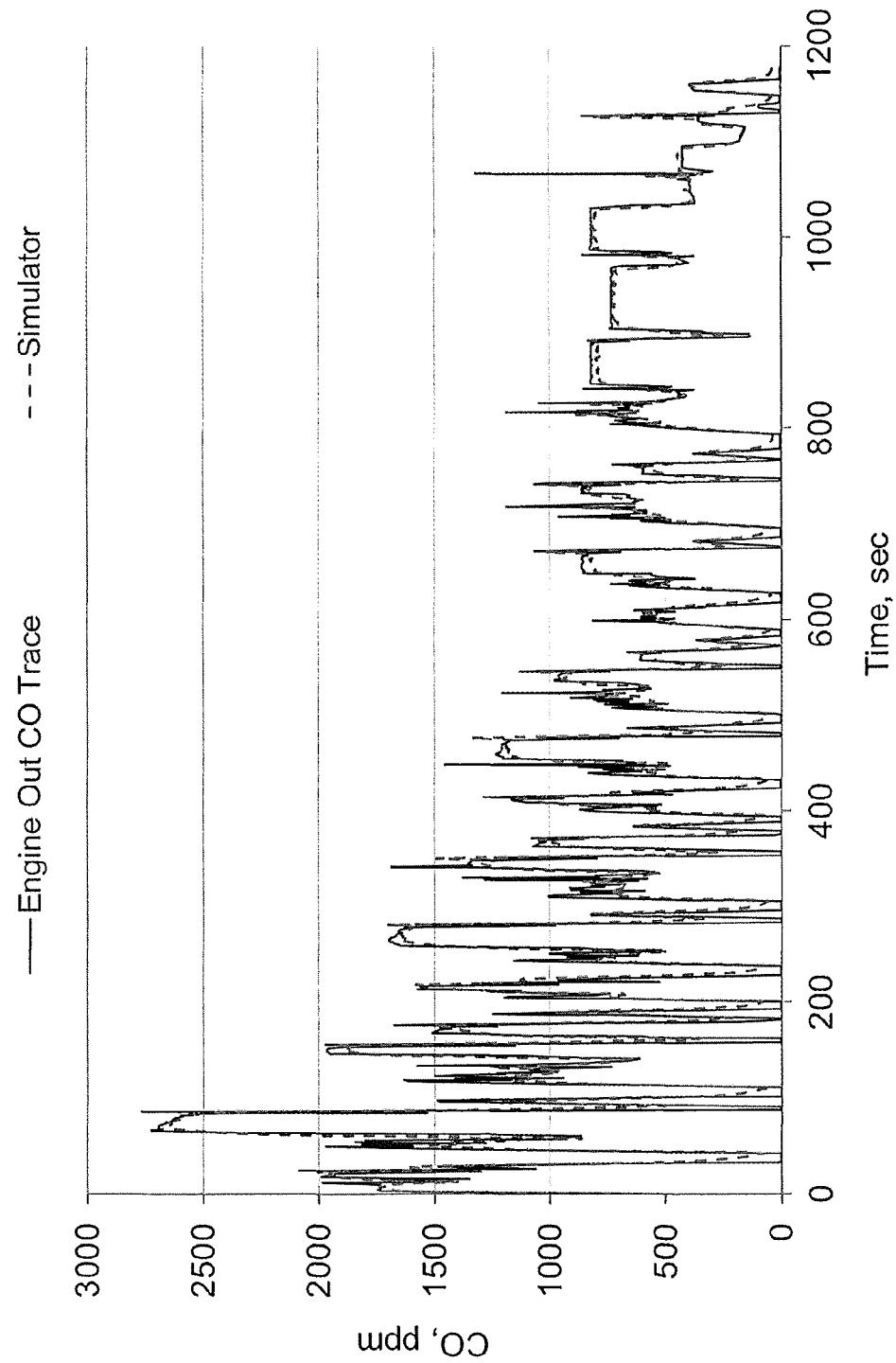
FIG. 7 is a graphical comparison of engine out CO emissions between the vehicle trace and simulator.

The coated cores were hydrothermally aged in a tube furnace at 800° C. for 16 hours with a feed gas composition of 10% $H_2O$, 10% $O_2$ balance $N_2$. The aged samples were evaluated in a lab reactor equipped to conduct a simulated NEDC (New European Driving Cycle) with a separate feed line for $H_2/N_2$ serving as the source for $H_2$ pulse. Engine out temperature traces between vehicle and simulator are provided in FIG. 6, and engine out CO emissions between the vehicle trace and simulator are provided in FIG. 7.

Hydrogen was pulsed into the exhaust stream during the first 400 seconds of the cycle with a hydrogen concentration in a feed gas of 0.5% or 1%. Hydrogen injection was performed via a separate (non-preheated) line carrying the $H_2/N_2$ feed gas. Results were obtained for % conversion of HC, CO and NO for coated core Example 1. The data obtained for the coated substrate of Example 1 with 1% $H_2$ pulse vs. no $H_2$ pulse were as follows:

|  |  | HC | CO | NO |
| --- | --- | --- | --- | --- |
|  | no H$_2$ | 69 | 56 | 33 |
| 100-200 sec | 0.5% H$_2$ | 73 | 62 | 35 |
| 100-200 sec | 1% H$_2$ | 74 | 64 | 35 |
| 0-100 sec | 1% H$_2$ | 74 | 67 | 35 |
| 0-200 sec | 1% H$_2$ | 77 | 72 | 37 |
| 0-300 sec | 1% H$_2$ | 82 | 84 | 42 |
| 0-400 sec | 1% H$_2$ | 80 | 87 | 45 |

The data demonstrate that hydrogen pulsing was highly effective towards the abatement of pollutants in an exhaust gas stream.

Hydrogen injection had a significant impact during the cold-start period of the NEDC protocol (0-200 seconds). NEDC results for % conversion of HC, CO and NO$_x$ were as follows for coated core Example 1 from 0-200 seconds

|  | HC | CO | NO |
| --- | --- | --- | --- |
| no H$_2$ | 58 | 14 | 9 |
| 1% H$_2$ | 73 | 54 | 40 |

The average inlet temperature for runs with no H$_2$ was 124° C. Inlet temperature for runs with 1% H$_2$ was 120° C.

Figure 8:
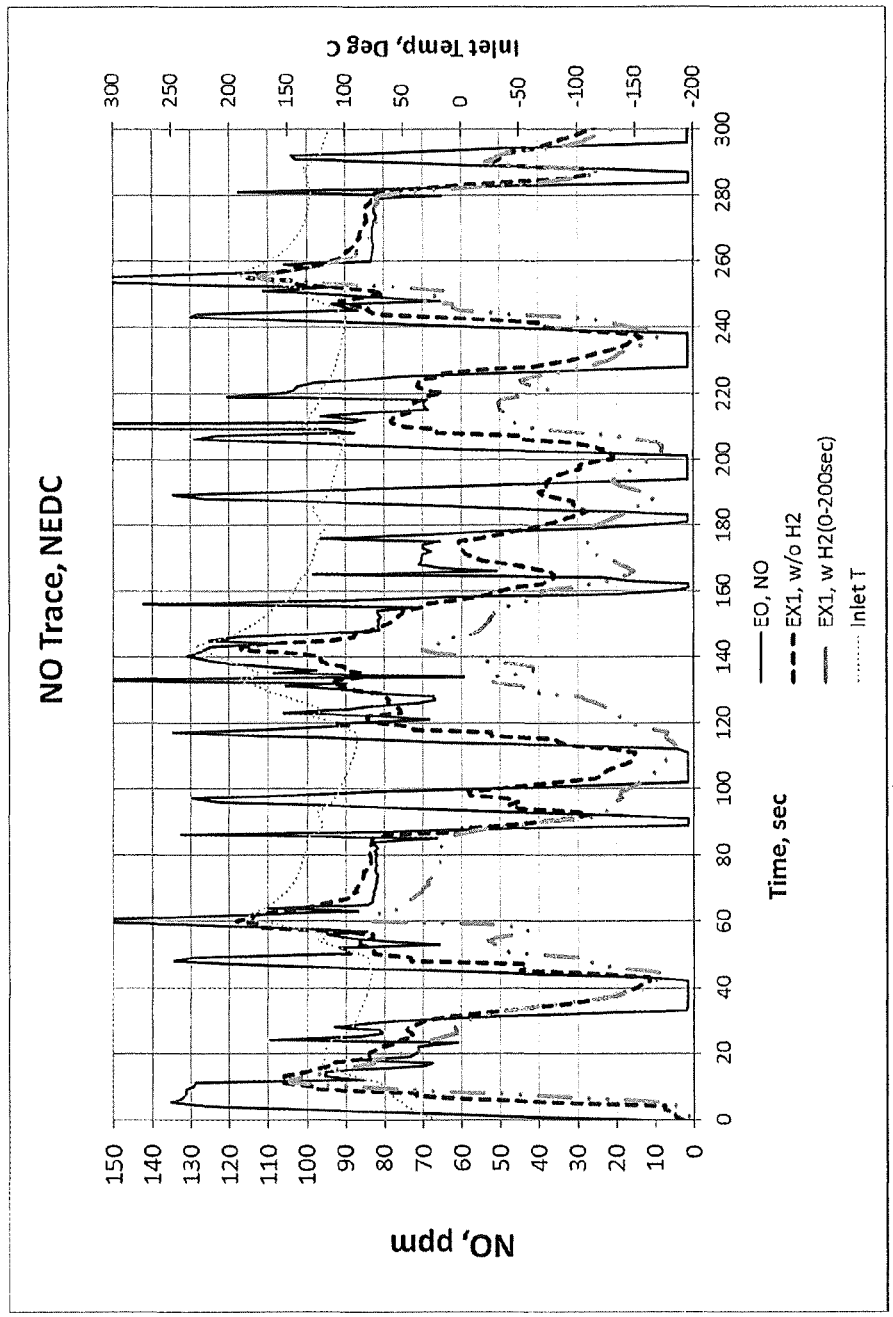
FIG. 8 is an NO trace for NEDC testing of Example 1.

An NO trace for NEDC testing of Example 1 is shown in FIG. 8. Reduction of NO emission during the hydrogen injection period was observed. The examples herein weft performed in a dynamic testing environment, in which temperature and speed, along with feed concentrations was constantly varied up and down to simulate driving conditions.

Testing was also performed with coated core Example 2. Results we re as follows:

|  |  | HC | CO | NO |
| --- | --- | --- | --- | --- |
|  | no H$_2$ | 70 | 69 | 20 |
| 100-200 sec | 0.5% H$_2$ | 77 | 72 | 21 |
| 100-200 sec | 1% H$_2$ | 79 | 75 | 22 |
| 0-100 sec | 1% H$_2$ | 81 | 82 | 22 |
| 0-200 sec | 1% H$_2$ | 82 | 85 | 24 |

Figure 9:
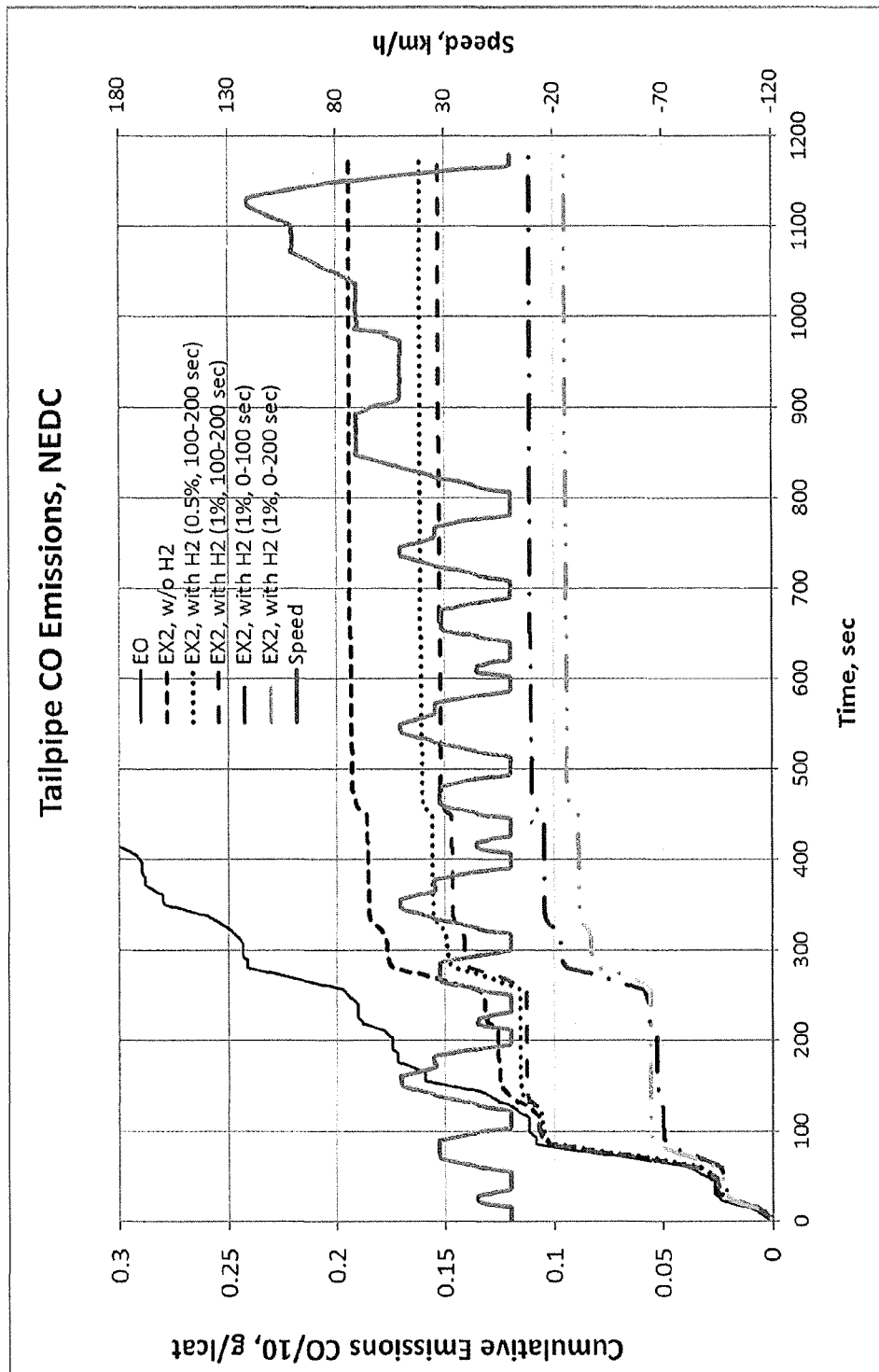
FIG. 9 is a cumulative CO emission plot of Example 2.

A cumulative CO emission plot, shown in FIG. 9, clearly indicates the benefits of hydrogen injection during the first 100 seconds of a cold-start period. Hydrogen injection had a significant impact during the cold-tart period of the NEDC protocol (0-200 seconds). NEDC results for % conversion of HC, CO and NO$_x$ were as follows for coated core Example 2 from 0-200 seconds:

|  | HC | CO | NO |
| --- | --- | --- | --- |
| no H$_2$ | 61 | 29 | 21 |
| 1% H$_2$ | 80 | 68 | 47 |

The average inlet temperature for runs with no H$_2$ was 120° C. Inlet temperature or runs with 1% H$_2$ was 118° C.

As the hydrogen impact became dominant only after 50 seconds into the NEDC cycle when the DOC inlet temperature was above 75° C., the hydrogen injection can therefore be tied to the DOC inlet temperature, to maximize the efficiency of hydrogen usage. To illustrate this important aspect of the application, a steady state light-off test was conducted, with H$_2$ injection at different temperatures, de the test performed as Example 4.

Example 4. Hydrogen Injection at Different Catalyst Inlet Temperatures: Aged Example 1 DOC The same aged core from Example 1 was used in the steady-state light-off test. The light-off test conditions were as listed below:

| Initial Temperature | 80° C. |
| --- | --- |
| Final Temperature | 400° C. |
| Thermal Ramp | 20°/min |
| Space Velocity | 55000 h$^{-1}$ |
| [CO$_2$] | 4% |
| [H$_2$O] | 4% |
| [O$_2$] | 14% |
| [CO] | 1500 ppm |
| [HC] | 430 ppm |
| (—)% CH$_4$ | 7% |
| (—)% C$_3$H$_6$ | 28% |
| (—)% HC$_{liq}$(C$_2$H$_8$—C$_{10}$H$_{22}$) | 65% |
| [NO$_x$] | 100 ppm |
| (—)% NO | 100% |

Figure 10:
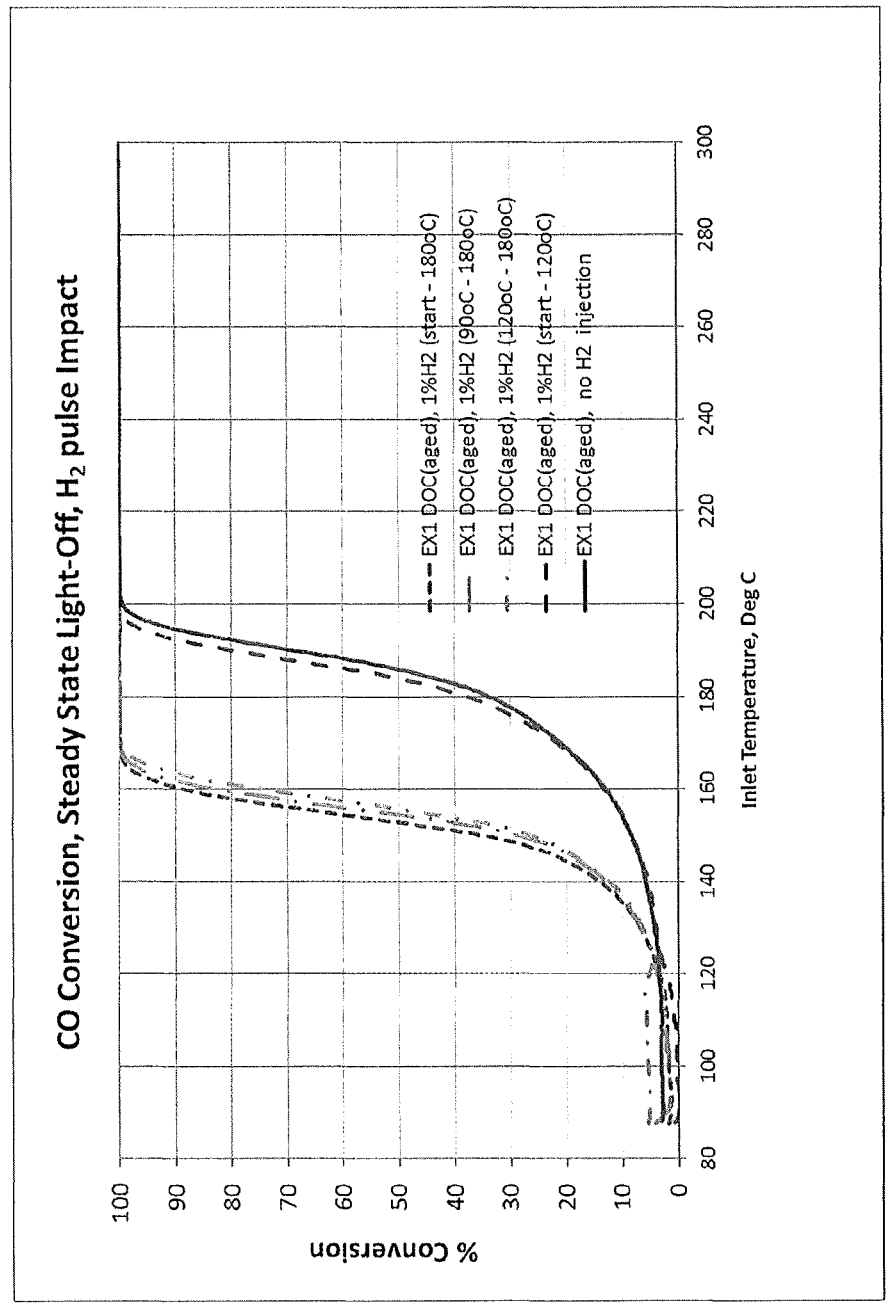
FIG. 10 is a plot depicting CO conversion results for Example 1.

The results as CO conversion versus DOC inlet temperature, are shown in FIG. 10.

Figure 11:
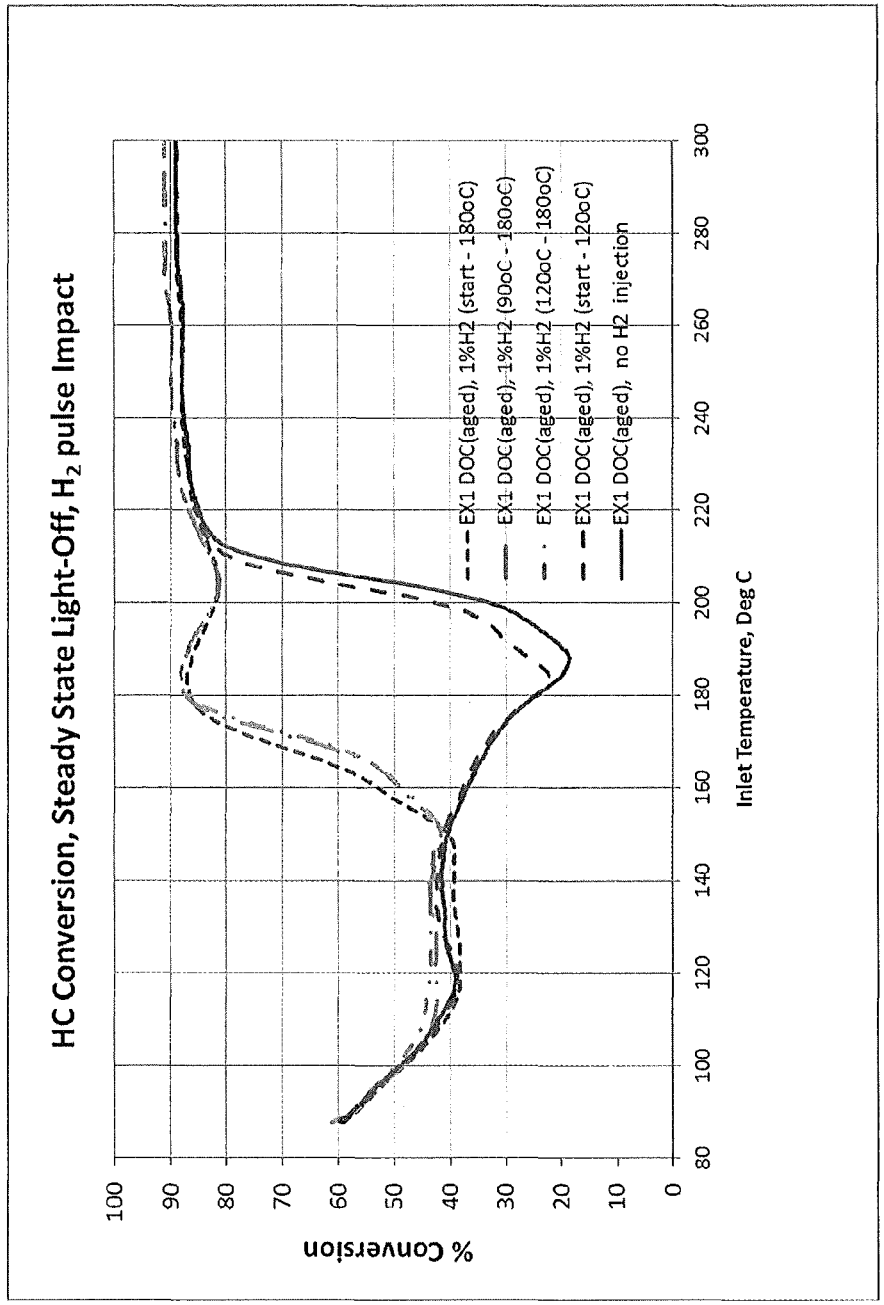
FIG. 11 is a plot depicting HC conversion results for Example 1.
Figure 12:
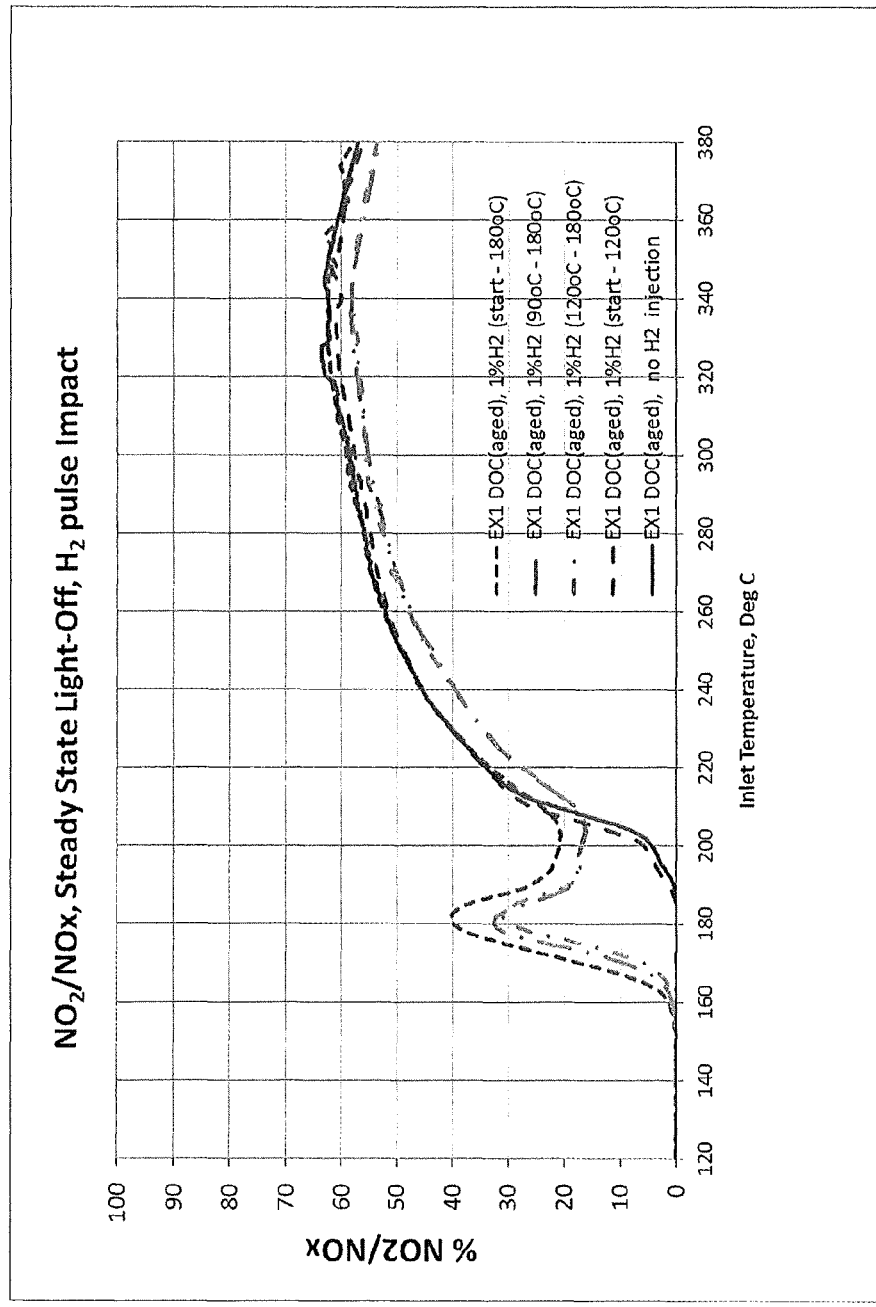
FIG. 12 is a plot depicting $NO_2/NO_x$ conversion results for Example 1.

The data indicate that H$_2$ injection on the aged Example 1 DOC can be effective for CO conversion enhancement at an inlet temperature of above 100° C., to avoid any water condensation, consistent with FIG. 9 dynamic (NEDC) testing results. As H$_2$ injection was provided through an unheated line, it is likely to reduce the inlet DOC temperature further during the H$_2$ injection tests, compared to the standard runs without H$_2$ injection. Therefore, it was considered more efficient to have H$_2$ injection starting at a temperature above 100° C. The H injection runs in FIGS. 10, 11, and 12, with an injection starting temperature above 120° C., all showed good CO/HC conversions, and good NO$_2$/NO$_x$ values at the low temperature region (from 160° C. to 200° C.). As the values were similar among all the runs with the Hr injection periods varying from the start of the light-off test to 180° C., from 90° C. to 180° C., and from 120° C. to 180° C., the most efficient way to use the least amount of hydrogen was to start H$_2$ injection at a DOC inlet temperature of 120° C. To further prove this concept, the fresh Example 2 DOC was tested in the same light-off protocol (Example 5).

Figure 13:
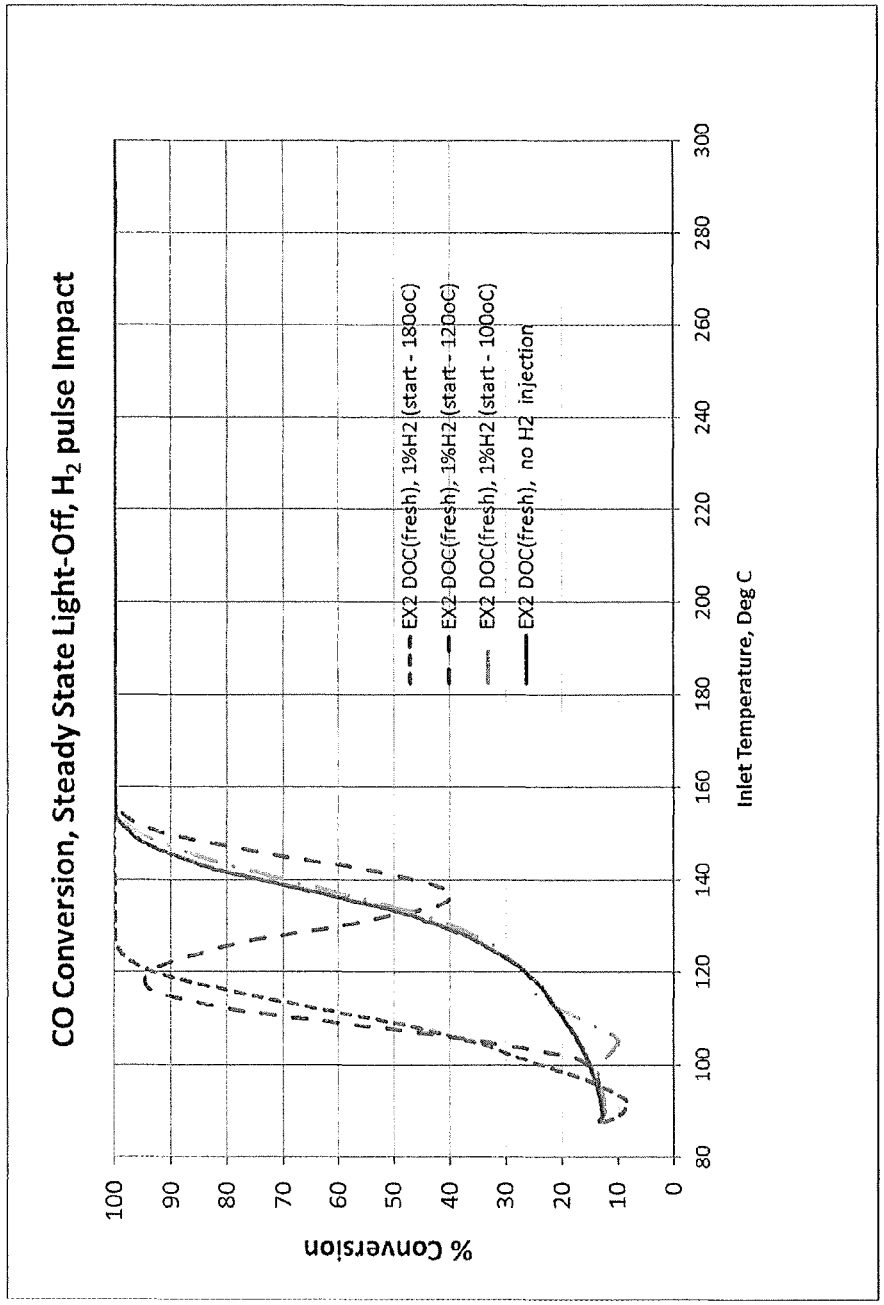
FIG. 13 is a plot depicting CO conversion results for Example 2 (fresh)
Figure 14:
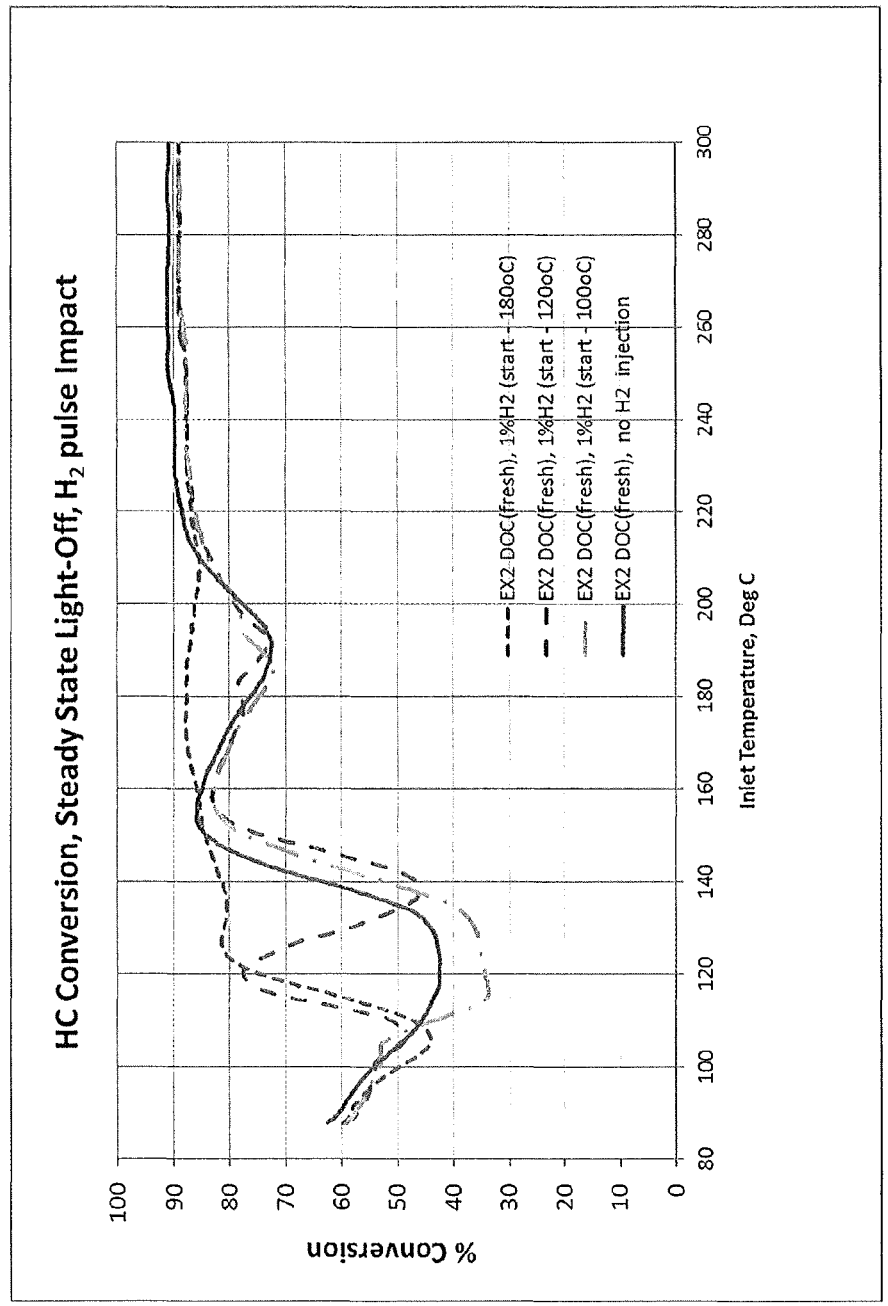
FIG. 14 is a plot depicting HC conversion results for Example 2 (fresh)

Example 5. Hydrogen Injection at Different Catalyst Inlet Temperatures: Fresh Example 2 DOC A fresh core from Example 2 was used in the same steady-state light-off test of Example 4. The results, as CO conversion versus DOC inlet temperature, obtained are shown in FIG. 13. Again, stopping hydrogen injection before the DOC inlet temperature reached 100° C. provided no CO light-off improvement benefits. Stopping hydrogen injection when the DOC inlet temperature reached 120° C. offered an initial CO conversion boost, as shown in FIG. 13, but it was not durable. The same phenomenon was observed for HC conversion in FIG. 14. Since the light-off curves for CO/HC fell back to the original light-off phenomenon, shown in both FIGS. 13 & 14, without wishing to be bound by theory, hydrogen injection may be viewed as a neutral booster that has no lasting impact on the catalyst itself. To further illustrate this hydrogen injection effect, an aged Example 2 DOC was tested in the same light-off protocol, (Example 6).

Example 6. Hydrogen Injection at Different Catalyst Inlet Temperatures: Aged Example 2 DOC An aged core from Example 2 was used in the same steady-state light-off test as performed in Examples 4 & 5.

Figure 15:
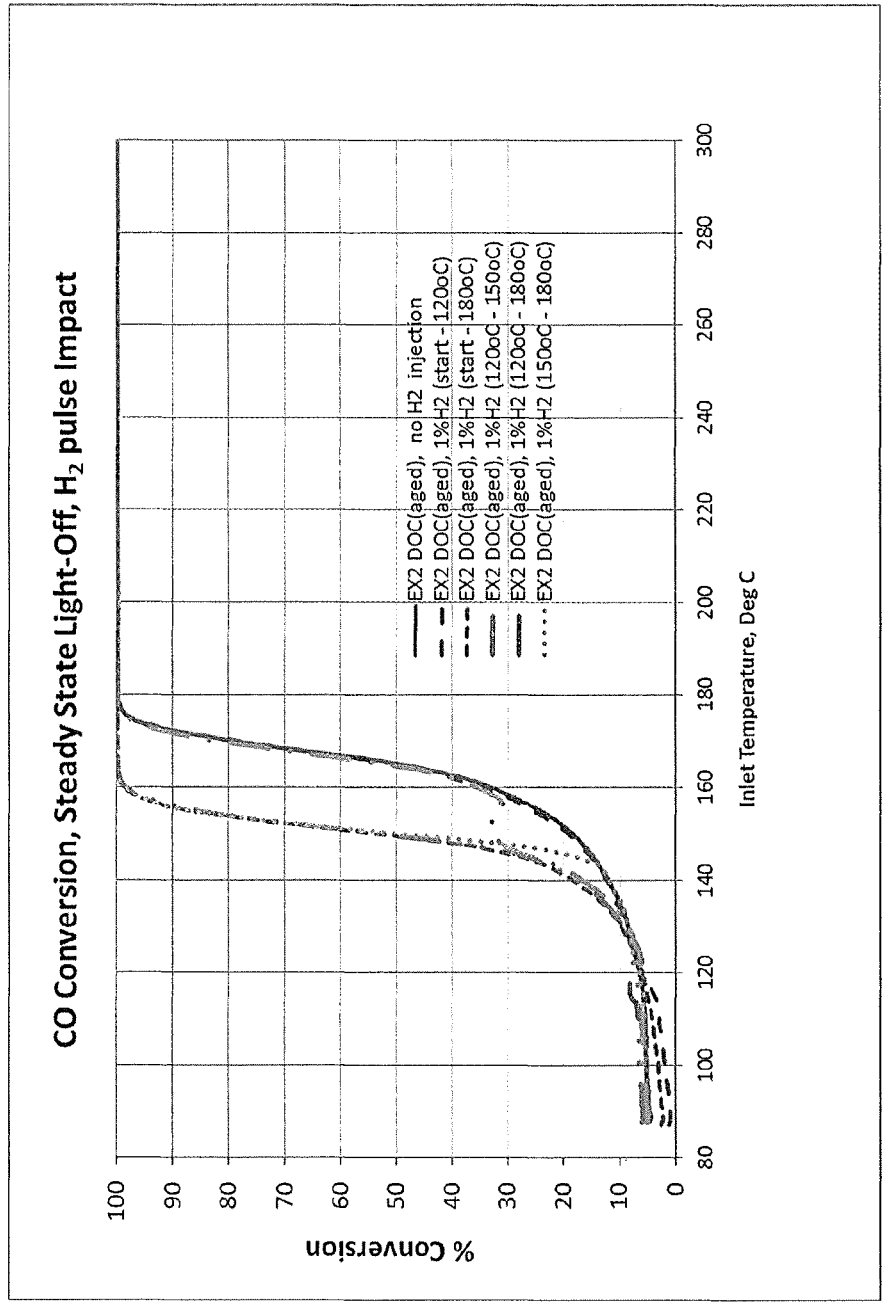
FIG. 15 is a plot depicting CO conversion results for Example 2 (aged)

To ascertain the sustainable light-off with the hydrogen injection, several hydrogen injection periods were tested on this aged Example 2 DOC. The results obtained, presented as CO conversion versus DOC inlet temperature are shown in FIG. 15.

Figure 16:
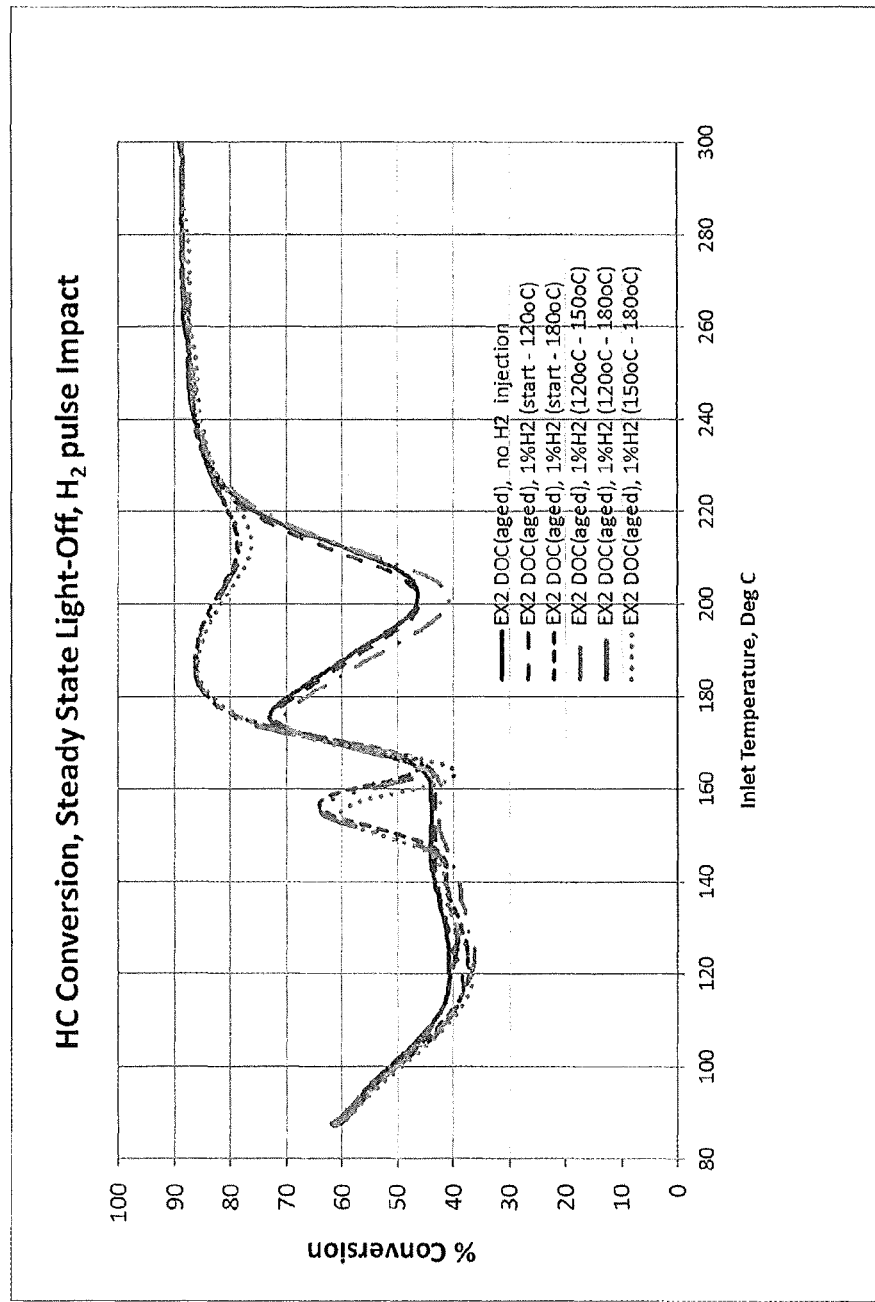
FIG. 16 is a plot depicting HC conversion results for Example 2 (aged)

The data demonstrate that a sustainable light-off can be obtained if the hydrogen injection period has passed the original light-off temperature (i.e., 50% conversion point), in this case, 164° C. Therefore, an early termination of hydrogen injection from the start of the light-off test to the DOC inlet temperature of 150° C. resulted in a CO light-off curve similar to the original light-off curve without the hydrogen injection, as shown in FIG. 15. A similar phenomenon was observed in HC light-off, shown in FIG. 16.

To explore further why the hydrogen injection promotes CO/HC conversions during the cold start period, Diffuse Reflectance Infrared Fourier Transform Spectroscopy (DRIFTS) experiments were carried out on an Agilent CARY680 FTIR spectrometer equipped with a mercury cadmium telluride (MCT—HgCdTe) detector and a Linkam high-temperature environmental chamber with a calcium fluoride ($CaF_2$) window. The sample powder was dehydrated in flowing Ar or reduced in flowing 2.4% $H_2$/Ar at 400° C. for 1 hour at a flow rate of 70 ml/min. The DRIFTS spectra were collected during the operando reactions carried at various temperatures (90, 120 and 180° C.). The absorbance spectra from the DRIFTS spectra were taken as a ratio to the background spectrum (the initial spectrum in Ar before reaction) and then used for analysis. In order to decouple the reactions for mechanism understanding, several sets of experiments were investigated using operando spectroscopy (Example 7).

Example 7. Operando Experiments: $CO+O_2$, with/without $H_2$

Figure 17:
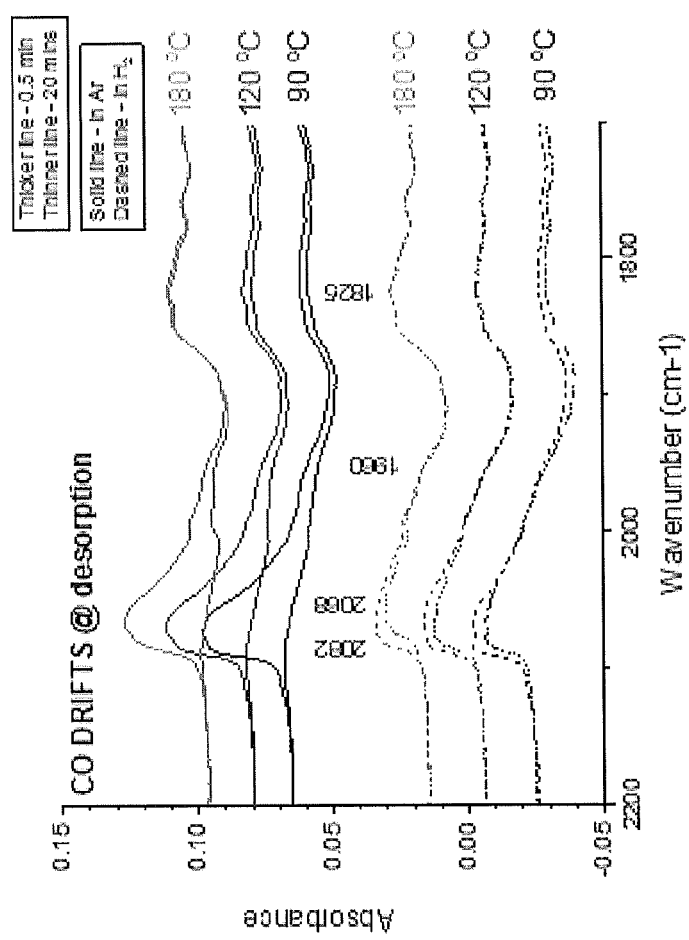
FIG. 17 is an infrared spectrum indicating CO desorption for fresh Example 1.

Powders were scraped from a fresh Example 1 DOC core and investigated using operando spectroscopy. The CO DRIFTS experiments on dehydrated and reduced fresh Example 1 DOC powders were conducted to investigate the $H_2$ and CO interaction on PGM surface. FIG. 17 shows the DRIFTS spectral data for CO desorption (pre-adsorbed CO by flowing 70 ml/min of 1% CO/Ar for 30 minutes) at three temperatures in two environments—argon vs. 2.4% $H_2$/Ar. The solid lines represent the desorption in argon, while the dashed lines represent the desorption in 2.4% $H_2$/Ar. The peak at 2060-2070 $cm^{-1}$ and the shoulder at 2082-2086 $cm^{-1}$ were assigned to CO linearly adsorbed on metallic Pt and Pd sites, respectively. The wide and weak features at 1950-1990 $cm^{-1}$ were due to CO bridge-adsorbed on two PGM atoms. A broad peak at ~1820 $cm^{-1}$ was assigned to CO adsorbed on three PGM atoms, which is an indication of large PGM particle formation. FIG. 17 demonstrates that the pre-adsorbed CO on the linear adsorption sites can be completely desorbed in Argon within 20 minutes, while only a slight decrease was observed for the desorption in $H_2$. The peak intensity on the double- and triple-bridged CO adsorption sites barely changed within 20 minutes for both desorption environments. Therefore, the introduction of $H_2$ does not remove CO from the PGM surface; without wishing to be bound by theory, the data suggest that the CO adsorption on the PGM surface is stronger than hydride bonding (if any). This simple CO DRIFTS experiments confirm that there is little or no competitive adsorption between CO and $H_2$ on the PGM surface.

Because hydrogen did not apparently aid in removal of adsorbed CO on the precious metal surface, either under the dynamic NEDC testing conditions or under the steady-state light-off conditions, as observed in Examples 3 to 6, it was desired to determine the effect of hydrogen injection on the DOC in enhancing CO/NC conversion.

Another experiment was therefore conducted using operando spectroscopy to further explore the role of hydrogen. In this experiment, NO and a mixture of $NO+NO_2$ were added into the original $CO+O_2$ feed gas mixture, respectively (in Example 8).

Example 8. Operando Experiments: $CO+O_2+NO/NO_x$, with/without $H_2$

The powders from an aged Example 1 DOC core, (Example 3), were scraped off and used for this $CO+O_2+NO/NO_x$, with/without $H_2$ experiment. The feed gas compositions for the experiments with respect to the mixture of $CO+O_2+NO$ were: CO: 0.1%, $O_2$:10%, NO: 300 ppm; balance Ar. When hydrogen was used for the hydrogen impact experiments, 2000 ppm $H_2$ was added into the feed gas. For the $CO+O_2+NO_x$ experiments, an additional 200 ppm of $NO_2$ was added.

Figure 19:
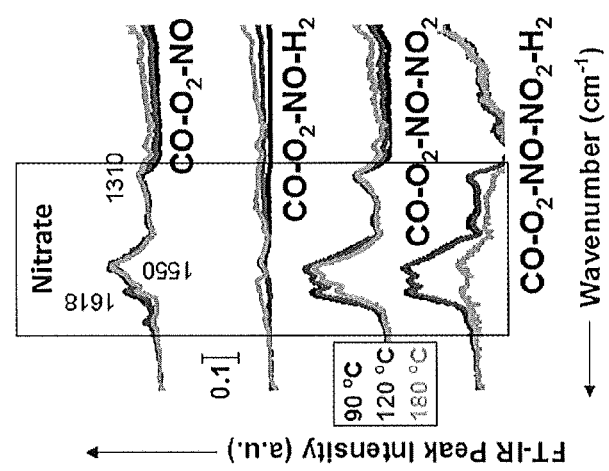
FIG. 19 is an infrared spectrum indicating nitrate concentration during CO oxidation under various conditions.
Figure 20:
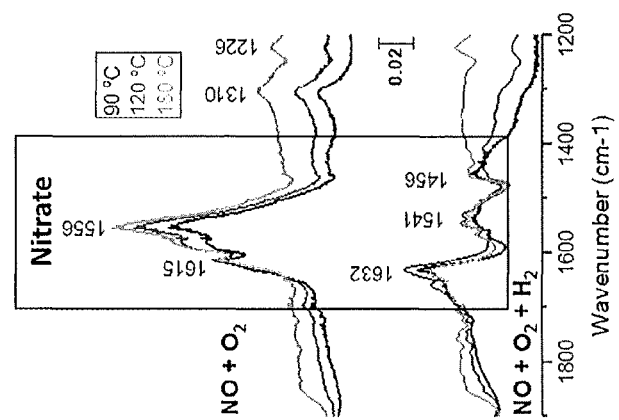
FIG. 20 is an infrared spectrum indicating nitrate concentration during NO oxidation under various conditions.

FIG. 18 demonstrates that some $N_2O$ was observed in the $CO-O_2-NO_x$ experiment (solid line in the bottom portion of FIG. 18) at 90-180° C., which, without wishing to be bound by theory, may come from $NO_2$ self-decomposition and/or CO and $NO_2$ interaction according to the equation: $3CO+2NO_2 \rightarrow N_2O+3CO_2$. The corresponding IR spectra in the nitrate region (FIG. 19) suggested in both cases (CO—$O_2$—NO and CO—$O_2$—$NO_x$) a large amount of nitrate species growing on the catalyst, which indicated that the NO oxidation was dominant at 90-180° C. when $H_2$ was not present. With similar formation mechanisms as for lean $NO_x$ trap (LNT) materials, the nitrate, formed by NO oxidation at the PGM surface at 90-180° C., was transferred to the support (illustrated in FIG. 20) which occupied the PGM-support interfacial sites (FIG. 20). As a result, CO conversion (black solid lines in FIG. 18) was compromised at 180° C.

When $H_2$ was present, almost no nitrate was built up in the case of the CO—$O_2$—NO—$H_2$ reactions at 90-180° C. (FIG. 19, top), and a much smaller amount of nitrate in the case of the CO—$O_2$—$NO_x$—$H_2$ reactions at 180° C. (FIG. 19, bottom). The decrease of nitrate build-up brought CO conversion back to 100% and 70% at 180° C. for CO—$O_2$—NO—$H_2$ and CO—$O_2$—$NO_x$—$H_2$ reactions, respectively (FIG. 18, top). A much greater $N_2O$ intensity was observed at 180° C. in the MKS results (shown as dashed line in FIG. 18, bottom). In conclusion, without wishing to be bound by theory, the data from the present Examples indicate that the introduction of hydrogen inhibited nitrate growth, and therefore promoted oxygen dissociation and consequently, hydrogen and CO oxidation.

What is claimed is:

1. A system for abatement of pollutants in an exhaust gas stream of an internal combustion engine, the system comprising:
   a catalytic article downstream of and in fluid communication with the internal combustion engine;
   a hydrogen generation system comprising an ammonia decomposition article configured to generate hydrogen, the ammonia decomposition article comprising an ammonia/organic solvent reservoir or an ammonia storage tank, and a catalytic reactor configured to collect hydrogen from ammonia;
   a hydrogen injection article in fluid communication with the catalytic article and with the exhaust gas stream of the internal combustion engine and configured to introduce hydrogen into the exhaust gas stream upstream of the catalytic article; and optionally, a hydrogen storage article.

2. The system of claim 1, wherein the hydrogen injection article is configured to introduce hydrogen intermittently on-demand.

3. The system of claim 1, wherein the hydrogen injection article is configured to introduce hydrogen from the hydrogen storage article.

4. The system of claim 1, wherein the hydrogen injection article comprises a valve configured to prevent the exhaust gas stream from entering the hydrogen storage article.

5. The system of claim 1, wherein the hydrogen injection article is configured to introduce hydrogen during a cold-start period.

6. The system of claim 1, wherein the hydrogen injection article is configured to introduce hydrogen when the exhaust gas stream entering the catalytic article is at a temperature of from about 0° C. to about 180° C.

7. The system of claim 1, wherein the system is effective for the abatement of one or more pollutants in an exhaust gas stream, the pollutants selected from the group consisting of CO, HC, NO, and combinations thereof.

8. The system of claim 1, wherein the catalytic article comprises a diesel oxidation catalyst (DOC) composition or a lean $NO_x$ trap catalyst composition.

9. The system of claim 1, wherein the system is integrated with a vehicle electronic management system.

10. A vehicle comprising the system of claim 1.

11. A method for abatement of pollutants in an exhaust gas stream of an internal combustion engine, the method comprising:

isolating ammonia from an ammonia/organic solvent solution or releasing ammonia from an ammonia storage tank;

decomposing ammonia in a catalytic reactor to provide hydrogen;

collecting the hydrogen;

storing the hydrogen; and introducing stored hydrogen via a hydrogen injection article into the exhaust gas stream downstream from the internal combustion engine and upstream of a catalytic article.

12. The method of claim 11, comprising intermittently introducing the stored hydrogen, optionally upon instruction from a vehicle electronic management system.

13. The method of claim 11, comprising introducing stored hydrogen during a cold-start period wherein the exhaust gas stream entering the catalytic article is at a temperature from about 0° C. to about 200° C.

14. The method of claim 11, wherein the method is effective in providing an increase in % conversion of one or more of CO, HC and NO relative to the % conversion in the absence of injection or release of stored hydrogen, wherein the increase in % conversion is ≥5%, ≥10%, ≥15%, ≥20%, ≥25%, ≥30%, ≥35%, ≥40%, ≥45%, ≥50%, ≥55% or ≥60%.

15. The method of claim 11, wherein the catalytic article comprises a diesel oxidation catalyst (DOC) composition and/or a lean $NO_x$ trap catalyst composition.

16. The method of claim 11, wherein the collecting, storing, isolating, releasing, decomposing, and introducing functions are performed via a vehicle on-board integrated system comprising articles configured for each function.

\* \* \* \* \*